(12) United States Patent
Jeon et al.

(10) Patent No.: US 12,224,823 B2
(45) Date of Patent: Feb. 11, 2025

(54) ELECTRONIC DEVICE AND METHOD FOR TRANSMITTING REFERENCE SIGNAL IN ELECTRONIC DEVICE

(71) Applicant: SAMSUNG ELECTRONICS CO., LTD., Suwon-si (KR)

(72) Inventors: Minhwan Jeon, Suwon-si (KR); Yeongseob Lim, Suwon-si (KR); Sungyoul Cho, Suwon-si (KR); Hyunkyung Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 23 days.

(21) Appl. No.: 18/120,573

(22) Filed: Mar. 13, 2023

(65) Prior Publication Data

US 2023/0216560 A1 Jul. 6, 2023

Related U.S. Application Data

(63) Continuation of application No. PCT/KR2021/012282, filed on Sep. 9, 2021.

(30) Foreign Application Priority Data

Sep. 16, 2020 (KR) .................... 10-2020-0118920

(51) Int. Cl.
*H04B 7/06* (2006.01)
*H04L 5/00* (2006.01)
*H04W 72/1268* (2023.01)

(52) U.S. Cl.
CPC ......... *H04B 7/0608* (2013.01); *H04L 5/0048* (2013.01); *H04W 72/1268* (2013.01)

(58) Field of Classification Search
CPC ...... H04B 7/0608; H04B 1/3827; H04B 1/40; H04B 7/0404; H04B 17/12; H04B 17/309;
(Continued)

(56) References Cited

U.S. PATENT DOCUMENTS

2010/0103902 A1 4/2010 Kim et al.
2010/0285762 A1* 11/2010 Ko .................. H04L 5/0048
455/127.1
(Continued)

FOREIGN PATENT DOCUMENTS

JP 2003-304216 10/2003
JP 2013-123138 6/2013
(Continued)

OTHER PUBLICATIONS

International Search Report dated Dec. 22, 2021 in PCT/KR2021/012282.
Written Opinion dated Dec. 22, 2021 in PCT/KR2021/012282.

*Primary Examiner* — Vineeta S Panwalkar
(74) *Attorney, Agent, or Firm* — Nixon & Vanderhye, P.C.

(57) ABSTRACT

An example electronic device includes a communication processor; at least one radio frequency integrated circuit (RFIC) connected to the communication processor; at least one radio frequency front-end (RFFE) circuit connected to the at least one RFIC and configured to process a transmission signal; and a plurality of antennas connected through the at least one RFFE circuit. The communication processor may control to transmit, at a first time point when a reference signal is to be transmitted through a first antenna from among the plurality of antennas, the reference signal to a base station through the first antenna; and transmit, at a second time point when the reference signal is to be transmitted through a second antenna from among the plurality of antennas, a reference signal adjusted at least based on a signal received through the second antenna to the base station through the first antenna.

16 Claims, 19 Drawing Sheets

(58) Field of Classification Search
CPC ... H04B 1/3838; H04L 5/0048; H04L 5/0023; H04L 5/006; H04L 25/02; H04L 5/0051; H04L 25/0224; H04W 72/1268; H04W 72/21

See application file for complete search history.

(56) References Cited

U.S. PATENT DOCUMENTS

| | | | |
|---|---|---|---|
| 2011/0096815 | A1 | 4/2011 | Shin et al. |
| 2011/0199944 | A1 | 8/2011 | Chen et al. |
| 2011/0294529 | A1 | 12/2011 | Luo et al. |
| 2012/0039273 | A1* | 2/2012 | Nam ............ H04W 52/325 455/450 |
| 2012/0063529 | A1 | 3/2012 | Choi et al. |
| 2014/0211737 | A1 | 7/2014 | Takeda et al. |
| 2015/0382307 | A1 | 12/2015 | Harper et al. |
| 2018/0123707 | A1 | 5/2018 | Morishige et al. |
| 2019/0097715 | A1 | 3/2019 | Maldonado et al. |
| 2019/0190747 | A1 | 6/2019 | Park et al. |
| 2019/0253214 | A1 | 8/2019 | Liu et al. |
| 2020/0127698 | A1 | 4/2020 | Cho et al. |
| 2021/0384991 | A1 | 12/2021 | Yang et al. |

FOREIGN PATENT DOCUMENTS

| | | |
|---|---|---|
| JP | 2017-038406 | 2/2017 |
| JP | 3 595 188 | 1/2020 |
| KR | 10-2008-0112115 | 12/2008 |
| KR | 10-2010-0121876 | 11/2010 |
| KR | 10-2011-0133448 | 12/2011 |
| KR | 10-2012-0086300 | 8/2012 |
| KR | 10-2014-0040858 | 4/2014 |
| KR | 10-2017-0028309 | 3/2017 |
| KR | 10-2017-0137074 | 12/2017 |
| KR | 10-2019-0039398 | 4/2019 |
| KR | 10-2020-0043735 | 4/2020 |
| KR | 10-2020-0046344 | 5/2020 |
| WO | 2011/055943 | 5/2011 |
| WO | 2018/203728 | 11/2018 |
| WO | 2019-051231 | 3/2019 |

* cited by examiner

ELECTRONIC DEVICE AND METHOD FOR TRANSMITTING REFERENCE SIGNAL IN ELECTRONIC DEVICE

CROSS-REFERENCE TO RELATED APPLICATIONS

This application is a continuation of International Application No. PCT/KR2021/012282, designating the United States, filed on Sep. 9, 2021, in the Korean Intellectual Property Receiving Office and claiming priority to Korean Patent Application No. 10-2020-0118920, filed on Sep. 16, 2020 in the Korean Intellectual Property Office. The disclosures of each of these applications are incorporated by reference herein in their entireties.

BACKGROUND

Field

The disclosure relates to an electronic device and a method for transmitting a reference signal in the electronic device.

Description of Related Art

As mobile communication technologies have developed, portable terminals that provide various functions have become popular. Accordingly, an effort to develop a 5G communication system is being made in order to meet increasing wireless data traffic demand. In order to achieve a high data transmit rate, the 5G communication system considers implementation in a higher frequency band (e.g., a 25 to 60 GHz band, in addition to implementation in a high frequency band which has been used by a 3G communication system and a long term evolution (LTE) communication system, so as to provide a high data transmit speed.

For example, in order to mitigate path loss of a radio wave and increase a delivery distance of the radio wave in an mmWave band, the 5G communication system has discussed beamforming, massive MIMO, and full dimensional MIMO (FD-MIMO), array antenna, analog beam-forming, and large scale antenna technologies.

As a scheme of implementing 5G communication, a standalone (SA) scheme and a non-stand alone (NSA) scheme are considered. The SA scheme may be a scheme using only a new radio (NR) system, and the NSA scheme may be a scheme using the NR system together with an existing LTE system. In the NSA scheme, a user equipment (UE) may use an eNB in an LTE system, and a gNB in an NR system. A technology that allows a user terminal to operate in different communication systems may be referred to as dual connectivity.

SUMMARY

In order for an electronic device to transmit a signal to a communication network (e.g., a base station), data generated from a processor or a communication processor in the electronic device may be signal processed via a radio frequency integrated circuit (RFIC) and a radio frequency front end (RFFE) circuit (hereinafter, referred to as 'RFFE' for convenience) and then transmitted to the outside via an antenna.

The electronic device may transmit a reference signal (e.g., a sounding reference signal (SRS)) to which the base station of the communication network refers for channel estimation to at least one antenna via the RFFE. The base station may efficiently allocate a downlink bandwidth by estimating a channel based on the reference signal transmitted from the electronic device, and perform multi-antenna signal processing or beamforming processing. The electronic device may improve data reception performance by receiving a multi-antenna signal processed or beamforming processed signal from the base station.

For example, an electronic device supporting 1T4R may sequentially transmit reference signals by connecting transmission circuits to four reception antennas (Rx0, Rx1, Rx2, and Rx3) with a switch. In this case, a component (e.g., an RFFE or a power amplifier (PA) or a switch) on the transmission circuit in the electronic device is located close to a transmission antenna (Tx0, Rx0) to ensure quality in a uplink, and power of a reference signal outputted through another reception antenna (Rx1, Rx2, Rx3), which may be connected to the transmission circuit via the switch, may be greatly attenuated compared to power of a reference signal transmitted via the transmission antenna due to path loss (PL). A downlink band allocation gain according to Tx antenna switching (TAS) of a reference signal has a higher effect when magnitude of power of a reference signal transmitted via each antenna of the electronic device is the same or similar, and if the magnitude of the power of the reference signal differs by certain magnitude or more (e.g., a difference of 3 dB or more), performance improvement effect according to the reference signal may be reduced. In addition, if magnitude of power of a transmission signal with respect to the reference signal differs by a certain magnitude or more, the electronic device loses a chance to receive high resource allocation (e.g., 4 layers, 256QAM modulation) in an actual use environment, which may lead to performance degradation.

Various embodiments may provide an electronic device which may transmit a reference signal via at least one antenna which corresponds to a transmission path having a relatively small path loss among a plurality of antennas upon transmitting the reference signal and a method to transmit the reference signal in the electronic device.

According to various example embodiments, an electronic device includes a communication processor, at least one radio frequency integrated circuit (RFIC) connected to the communication processor, at least one radio frequency front-end (RFFE) circuit connected to the at least one RFIC and configured to process a transmission signal, and a plurality of antennas connected via the at least one RFFE circuit, and the communication processor may be configured to control to transmit a reference signal to a base station via a first antenna among the plurality of antennas at a first time point at which the reference signal is to be transmitted via the first antenna, and control to transfer, to the base station via the first antenna, a reference signal which is adjusted at least based on a signal received via a second antenna among the plurality of antennas at a second time point at which the reference signal is to be transmitted via the second antenna.

According to various embodiments, an electronic device includes a communication processor, at least one radio frequency integrated circuit (RFIC) connected to the communication processor, at least one radio frequency front-end (RFFE) circuit connected to the at least one RFIC and configured to process a transmission signal, and a plurality of antennas connected via the at least one RFFE circuit, and the communication processor may be configured to identify whether a specific absorption rate (SAR) event occurs, identify at least one antenna related to the SAR event among the plurality of antennas, and control to transmit a reference signal which is adjusted at least based on a signal received via at least one antenna related to the SAR event among the plurality of antennas to the base station via at least one antenna not related to the SAR event at a time point at which a reference signal is to be transmitted via the at least one antenna related to the SAR event.

According to various embodiments, in a method to transmit a reference signal in an electronic device comprising a communication processor, at least one radio frequency integrated circuit (RFIC) connected to the communication processor, at least one radio frequency front-end (RFFE) circuit connected to the at least one RFIC and configured to process a transmission signal, and a plurality of antennas connected via the at least one RFFE circuit, the method may include transmitting a reference signal to a base station via a first antenna among the plurality of antennas at a first time point at which the reference signal is to be transmitted via the first antenna, and transmitting, to the base station via the first antenna, a reference signal which is adjusted at least based on a signal received via a second antenna among the plurality of antennas at a second time point at which the reference signal is to be transmitted via the second antenna.

According to various embodiments, in a method to transmit a reference signal in an electronic device comprising a communication processor, at least one radio frequency integrated circuit (RFIC) connected to the communication processor, at least one radio frequency front-end (RFFE) circuit connected to the at least one RFIC and configured to process a transmission signal, and a plurality of antennas connected via the at least one RFFE circuit, the method may include identifying whether a specific absorption rate (SAR) event occurs, identifying at least one antenna related to the SAR event among the plurality of antennas, and transmitting a reference signal which is adjusted at least based on a signal received via at least one antenna related to the SAR event among the plurality of antennas to the base station via at least one antenna not related to the SAR event at a time point at which a reference signal is to be transmitted via the at least one antenna related to the SAR event.

According to various embodiments, an electronic device may transmit a reference signal (e.g., a sounding reference signal (SRS)) via an antenna which corresponds to a transmission path having a relatively small path loss among a plurality of transmission paths upon transmitting the reference signal.

According to various embodiments, an electronic device may transmit a reference signal via an antenna which corresponds to a transmission path having a relatively small path loss upon transmitting the reference signal, so downlink resource allocation suitable for an actual situation may be expected, and through this, quality competitiveness of the electronic device may be strengthened. In addition, it is possible to simplify circuit implementation of the electronic device and reduce stress applied to a circuit, thereby improving cost competitiveness and reliability of a product.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
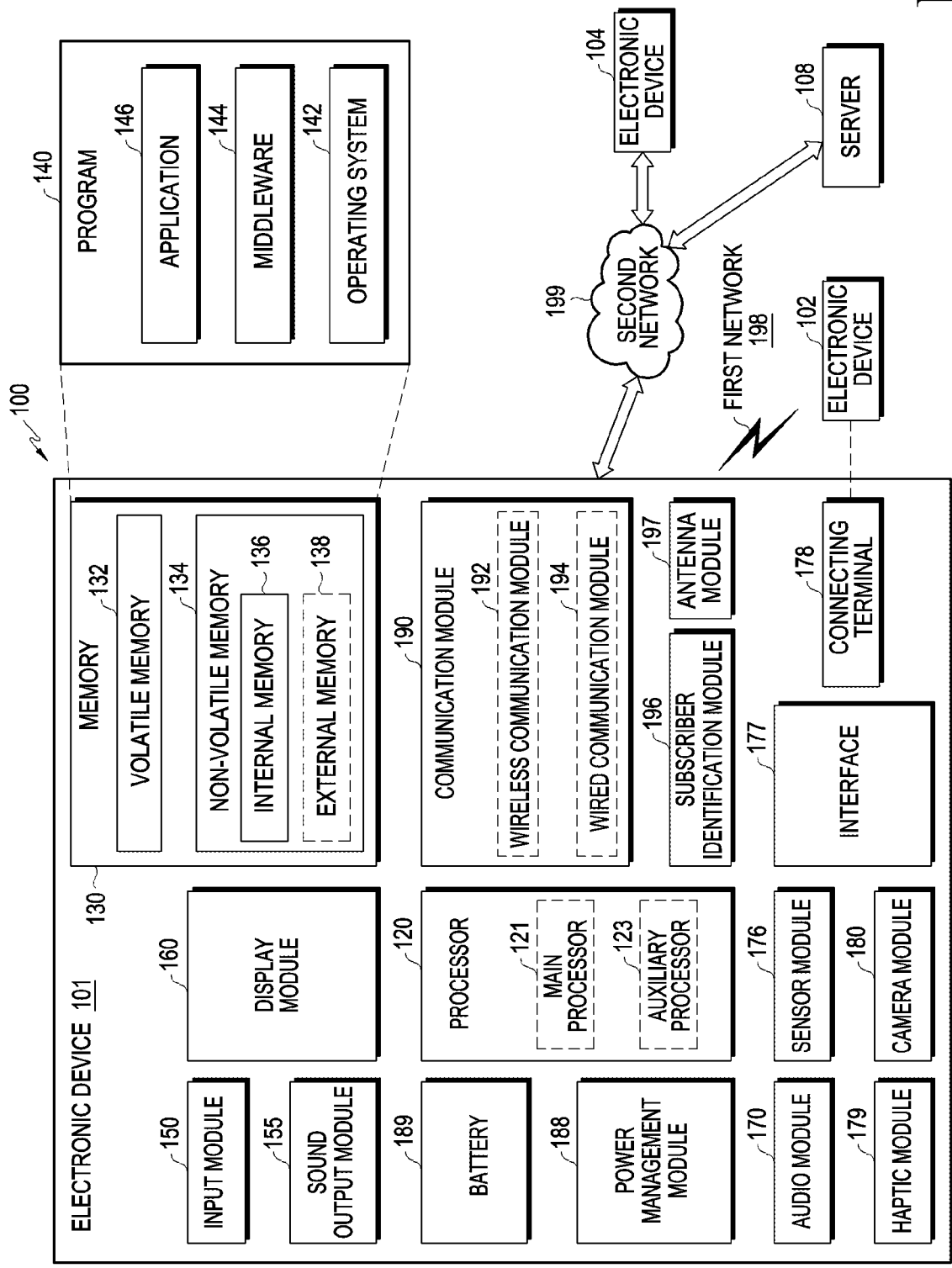
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198

(e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one of the components (e.g., the connecting terminal 178) may be omitted from the electronic device 101, or one or more other components may be added in the electronic device 101. In an embodiment, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type from, the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
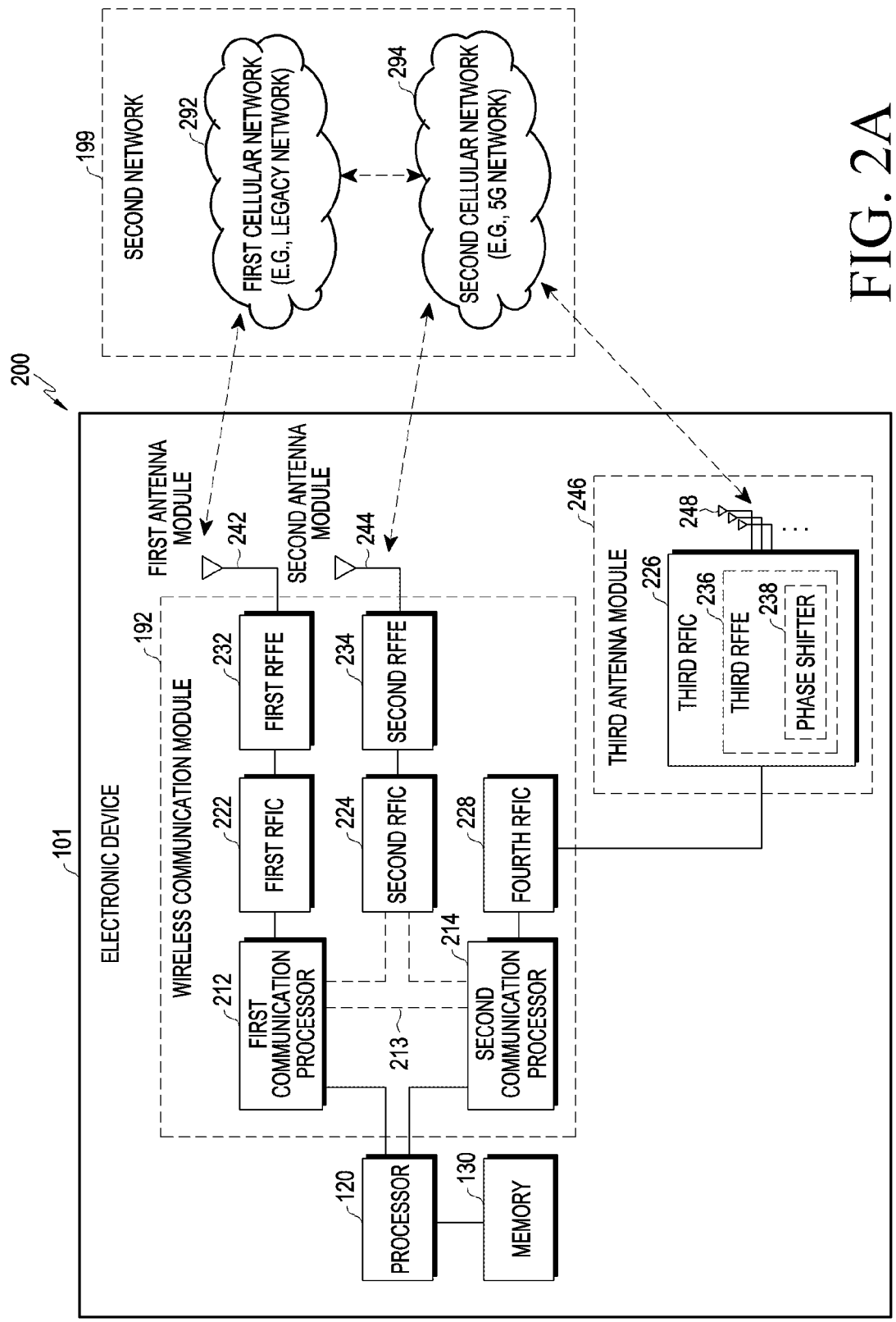
FIG. 2A is a block diagram illustrating an example electronic device for supporting a legacy network communication and a 5G network communication according to various embodiments.

FIG. 2A is a block diagram 200 illustrating an electronic device 101 for supporting a legacy network communication and a 5$^{th}$ generation (5G) network communication according to various embodiments. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. A second network 199 may include a first cellular network 292 and a second cellular network 294. According to an embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of a wireless communication module 192. According to an embodiment, the fourth RFIC 228 may be omitted or included as part of the third RFIC 226.

The first communication processor 212 may establish a communication channel in a band to be used for a wireless communication with the first cellular network 292 and support a legacy network communication via the established communication channel According to various embodiments, the first cellular network 292 may be a legacy network including a 2$^{nd}$ generation (2G), 3$^{rd}$ generation (3G), 4$^{th}$ generation (4G), or LTE network. The second communication processor 214 may establish a communication channel corresponding to a specified band (e.g., about 6 GHz to about 60 GHz) out of a band to be used for a wireless communication with the second cellular network 294 and support a 5G network communication via the established communication channel. According to various embodiments, the second cellular network 294 may be a 5G network defined by the 3GPP. Additionally, according to an embodiment, the first communication processor 212 or the second communication processor 214 may establish a communication channel corresponding to another specified band (e.g., about 6 GHz or less) out of the band to be used for the wireless communication with the second cellular network 294 and support a 5G network communication via the established communication channel.

The first communication processor 212 may transmit and receive data to and from the second communication processor 214. For example, data supposed to be transmitted via a second cellular network 294 may be scheduled to be transmitted via a first cellular network 292. In this case, the first communication processor 212 may receive transmission data from the second communication processor 214. For example, the first communication processor 212 may transmit and receive data to and from the second communication processor 214 via an inter-processor interface 213. The inter-processor interface 213 may be implemented as, for example, a universal asynchronous receiver/transmitter (UART) (e.g., high speed-UART (HS-UART)) or a peripheral component interconnect bus express (PCIe) interface, but a type thereof is not limited. Alternatively, the first communication processor 212 and the second communication processor 214 may exchange control information and packet data information using, for example, a shared memory. The first communication processor 212 may transmit and receive various pieces of information such as sensing information, information about output strength, and resource block (RB) allocation information to and from the second communication processor 214.

Depending on their implementation, the first communication processor 212 may not be coupled directly to the second communication processor 214. In this case, the first communication processor 212 may transmit and receive data to and from the second communication processor 214 via the processor 120 (e.g., an application processor). For example, the first communication processor 212 and the second communication processor 214 may transmit and receive data to and from the processor 120 (e.g., an application processor) via an HS-UART interface or a PCIe interface, but a type of an interface is not limited. Alternatively, the first communication processor 212 and the second communication processor 214 may exchange control information and packet data information by using, for example, the processor 120 (e.g., the application processor) and the shared memory.

Figure 2B:
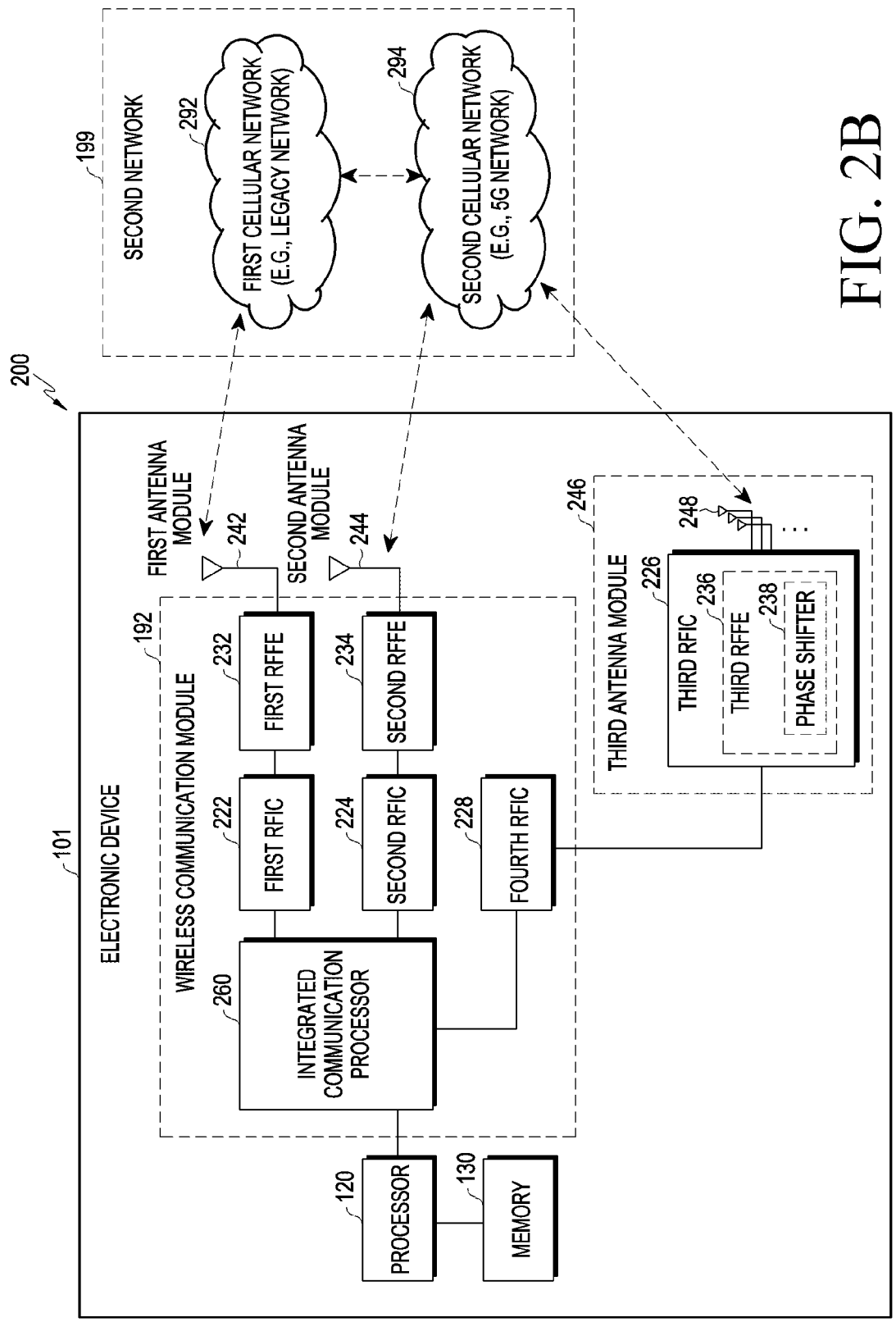
FIG. 2B is a block diagram illustrating an example electronic device for supporting a legacy network communication and a 5G network communication according to various embodiments.

According to an embodiment, the first communication processor 212 and the second communication processor 214 may be incorporated in a single chip or a single package. According to various embodiments, the first communication processor 212 or the second communication processor 214 may be incorporated together with the processor 120, an auxiliary processor 123, or a communication module 190 in a single chip or a single package. For example, as illustrated in FIG. 2B, an integrated communication processor 260 may support all of functions for a communication with the first cellular network 292 and the second cellular network 294.

For transmission, the first RFIC 222 may convert a baseband signal generated by the first communication processor 212 to an RF signal in a band of about 700 MHz to about 3 GHz used in the first cellular network 292 (e.g., the legacy network). For reception, an RF signal may be obtained from the first network 292 (e.g., the legacy network) via an antenna (e.g., the first antenna module 242) and pre-processed via an RFFE (e.g., the first RFFE 232). The first RFIC 222 may convert the pre-processed RF signal to a baseband signal so that the baseband signal may be processed by the first communication processor 212.

For transmission, the second RFIC 224 may convert a baseband signal generated by the first communication processor 212 or the second communication processor 214 to an RF signal in a Sub6 band (e.g., about 6 GHz or less) used in the second cellular network 294 (e.g., the 5G network). For reception, a 5G Sub6 RF signal may be obtained from the second cellular network 294 (e.g., the 5G network) via an antenna (e.g., the second antenna module 244) and pre-processed in an RFFE (e.g., the second RFFE 234). The second RFIC 224 may convert the pre-processed 5G Sub6 RF signal to a baseband signal so that the baseband signal may be processed by a corresponding one between the first communication processor 212 and the second communication processor 214.

For transmission, the third RFIC 226 may convert a baseband signal generated by the second communication processor 214 to an RF signal (hereinafter, referred to as, a 5G Above6 RF signal) in a 5G Above6 band (e.g., about 6 GHz to about 60 GHz) to be used in the second cellular network 294 (e.g., the 5G network). For reception, a 5G Above6 RF signal may be obtained from the second cellular network 294 (e.g., the 5G network) via an antenna (e.g., the antenna 248) and pre-processed via the third RFFE 236. The third RFIC 226 may convert the pre-processed 5G Above6 RF signal to a baseband signal so that the baseband signal may be processed by the second communication processor 214. According to an embodiment, the third RFFE 236 may be formed as part of the third RFIC 226.

According to an embodiment, the electronic device 101 may include the fourth RFIC 228 separately from or as part of the third RFIC 226. In this case, the fourth RFIC 228 may convert a baseband signal generated by the second communication processor 214 to an RF signal in an intermediate frequency band (e.g., about 9 GHz to about 11 GHz) (hereinafter, referred to as an intermediate frequency (IF) signal), and provide the IF signal to the third RFIC 226. The third RFIC 226 may convert the IF signal to a 5G Above6 RF signal. During reception, a 5G Above6 RF signal may be received from the second cellular network 294 (e.g., the 5G network) through an antenna (e.g., the antenna 248) and converted to an IF signal by the third RFIC 226. The fourth RFIC 228 may convert the IF signal to a baseband signal so that the baseband signal may be processed by the second communication processor 214.

Figure 2C:
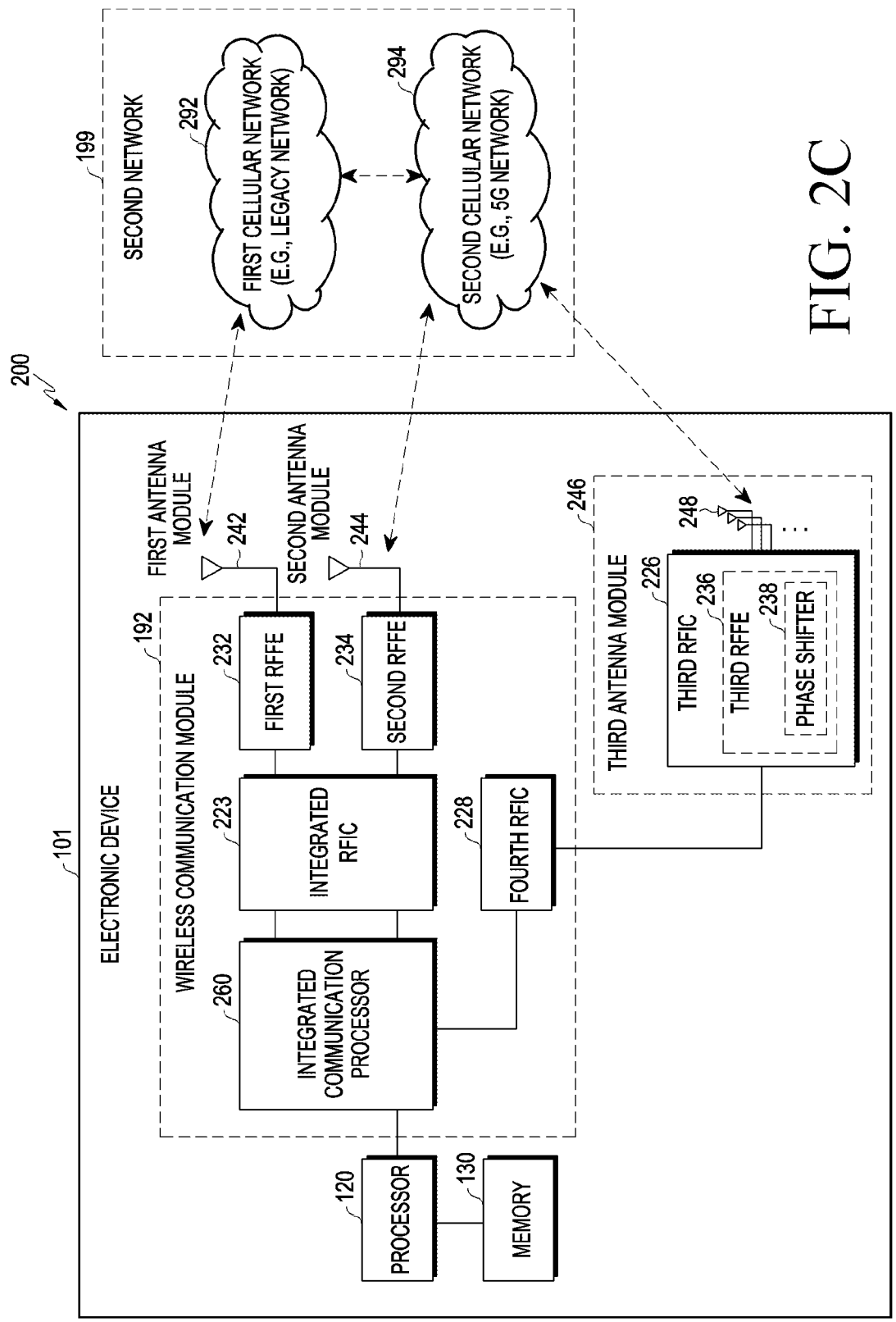
FIG. 2C is a block diagram illustrating an example electronic device for supporting a legacy network communication and a 5G network communication according to various embodiments.

According to an embodiment, the first RFIC 222 and the second RFIC 224 may be implemented as at least part of a single chip or a single package. According to various embodiments, if the first RFIC 222 and the second RFIC 224 are implemented as a single chip or a single package in FIG. 2A or 2B, the second RFIC 224 may be implemented with an integrated RFIC 223 as shown in FIG. 2C. In this case, the integrated RFIC 223 is connected to the first RFFE 232 and the second RFFE 234, so the integrated RFIC 223 may convert a baseband signal into a signal of a band supported by the first RFFE 232 and/or the second RFFE 234, and transmit the converted signal to one of the first RFFE 232 and the second RFFE 234. According to an embodiment, the first RFFE 232 and the second RFFE 234 may be implemented as at least part of a single chip or a single package.

According to an embodiment, at least one of the first antenna module 242 or the second antenna module 244 may be omitted or combined with the other antenna module to process RF signals in a plurality of corresponding bands.

According to an embodiment, the third RFIC 226 and the antenna 248 may be arranged on the same substrate to form a third antenna module 246. For example, the wireless communication module 192 or the processor 120 may be arranged on a first substrate (e.g., a main PCB). In this case, the third RFIC 226 may be arranged in a partial area (e.g., the bottom surface) of a second substrate (e.g., a sub PCB) other than the first substrate and the antenna 248 may be arranged in another partial area (e.g., the top surface) of the second substrate, to form the third antenna module 246. As the third RFIC 226 and the antenna 248 are arranged on the same substrate, it is possible to reduce length of a transmit line between the third RFIC 226 and the antenna 248. This may reduce, for example, loss (e.g., attenuation) of a signal in a high frequency band (e.g., about 6 GHz to about 60 GHz) used for a 5G network communication, on the transmit line. Therefore, the electronic device 101 may increase quality or a speed of a communication with the second network 294 (e.g., the 5G network).

According to an embodiment, the antenna 248 may be formed as an antenna array including a plurality of antenna elements which may be used for beamforming. In this case, for example, the third RFIC 226 may include a plurality of phase shifters 238 corresponding to the plurality of antenna elements, as part of the third RFFE 236. During transmission, each of the plurality of phase shifters 238 may change a phase of a 5G Above6 RF signal to be transmitted to the outside of the electronic device 101 (e.g., a base station in the 5G network) via a corresponding antenna element. During reception, each of the phase shifters 238 may change a phase of a 5G Above6 RF signal received from the outside via a corresponding antenna element to the same or substantially same phase. This enables transmission or reception via beamforming between the electronic device 101 and the outside.

The second cellular network 294 (e.g., the 5G network) may be operated independently of the first cellular network 292 (e.g., the legacy network) (e.g., SA (Stand-Alone)) or in connection to the first network 292 (e.g., the legacy network) (e.g., Non-Stand Alone (NSA)). For example, the 5G network may include only an access network (e.g., a 5G radio access network (RAN) or next generation RAN (NG RAN)) without a core network (e.g., a next generation core (NGC)). In this case, after accessing the access network of the 5G network, the electronic device 101 may access an external network (e.g., an Internet) under the control of a core network (e.g., an evolved packet core (EPC)) of the legacy network. Protocol information for a communication with the legacy network (e.g., LTE protocol information) and protocol information for a communication with the 5G network (e.g., New Radio (NR) protocol information) may be stored in the memory 130 and accessed by another component (e.g., the processor 120, the first communication processor 212, or the second communication processor 214).

Figure 3A:
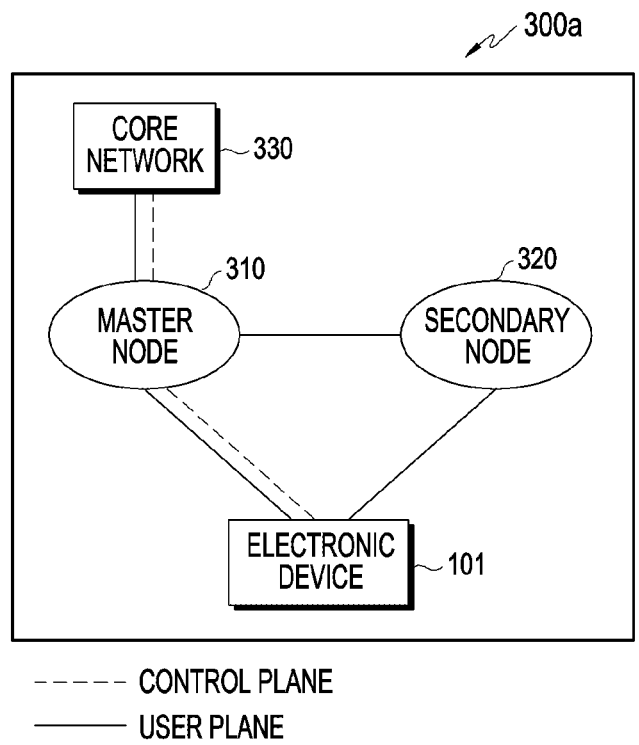
FIG. 3A is a diagram illustrating an example wireless communication system which provides a legacy communication network and/or a 5G communication network according to various embodiments.
Figure 3B:
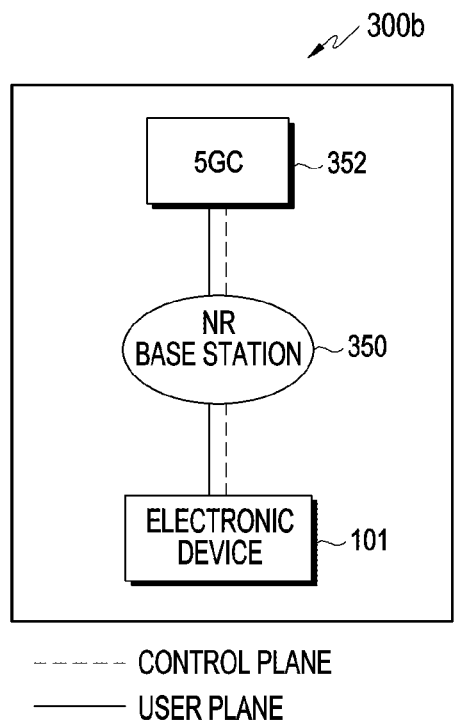
FIG. 3B is a diagram illustrating an example wireless communication system which provides a legacy communication network and/or a 5G communication network according to various embodiments.
Figure 3C:
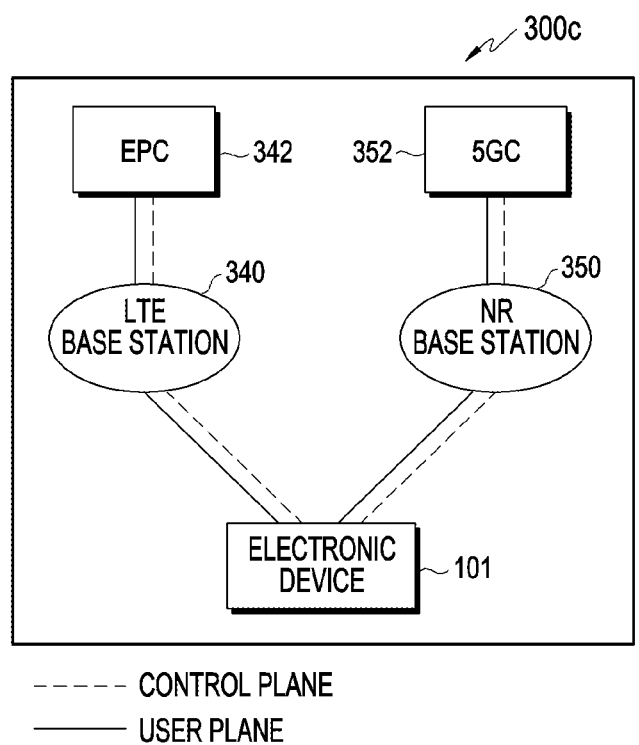
FIG. 3C is a diagram illustrating an example wireless communication system which provides a legacy communication network and/or a 5G communication network according to various embodiments.

FIGS. 3A, 3B, and 3C are diagrams illustrating a wireless communication system which provides a legacy communication network and/or a 5G communication network. Referring to FIGS. 3A, 3B, and 3C, network environments 300a to 300c may include at least one of a legacy network or a 5G network. The legacy network may include, for example, a 4G or LTE base station 340 (e.g., an eNB or eNodeB) of the 3GPP standard supporting a wireless access of the electronic device 101, and an EPC 342 which manages a 4G communication. The 5G network may include, for example, an NR base station 350 (e.g., gNB or gNodeB) supporting a wireless access of the electronic device 101, and a 5th generation core (5GC) 352 which manages a 5G communication of the electronic device 101.

According to various embodiments, the electronic device 101 may transmit and receive a control message and user data via a legacy communication and/or 5G communication. The control message may include a message related to at least one of, for example, security control, bearer setup, authentication, registration, or mobility management of the electronic device 101. The user data may refer to, for example, user data except for a control message transmitted and received between the electronic device 101 and a core network 330 (e.g., the EPC 342).

Referring to FIG. 3A, the electronic device 101 according to an embodiment may transmit and receive at least one of a control message or user data to and from at least part (e.g., an NR base station 350 and a 5GC 352) of the 5G network using at least part (e.g., an LTE base station 340 and an EPC 342) of the legacy network.

According to various embodiments, the network environment 300a may include a network environment which provides wireless communication dual connectivity (DC) to the LTE base station 340 and the NR base station 350 and transmits and receives a control message to and from the electronic device 101 via one core network 330 of the EPC 342 or the 5GC 352.

According to various embodiments, in a DC environment, one of the LTE base station 340 and the NR base station 350 may operate as a master node (MN) 310 and the other may operate as a secondary node (SN) 320. The MN 310 may be connected to the core network 330 and transmit and receive a control message to and from the core network 330. The MN 310 and the SN 320 may be connected to each other via a network interface and transmit and receive a message related to management of a wireless resource (e.g., a communication channel) to and from each other.

According to various embodiments, the MN 310 may include the LTE base station 340, the SN 320 may include the NR base station 350, and the core network 330 may include the EPC 342. For example, a control message may be transmitted and received via the LTE base station 340 and the EPC 342, and user data may be transmitted via at least one of the LTE base station 340 or the NR base station 350.

According to various embodiments, the MN 310 may include the NR base station 350, the SN 320 may include the LTE base station 340, and the core network 330 may include the 5GC 352. For example, a control message may be transmitted and received via the NR base station 350 and the 5GC 352, and user data may be transmitted via at least one of the LTE base station 340 or the NR base station 350.

Referring to FIG. 3B, according to various embodiments, a 5G network may include an NR base station 350 and a 5GC 352, and independently transmit and receive a control message and user data to and from an electronic device 101.

Referring to FIG. 3C, according to various embodiments, each of a legacy network and a 5G network may independently provide data transmission and reception. For example, an electronic device 101 may transmit and receive a control message and user data to and from an EPC 342 via an LTE base station 340. For another example, the electronic device 101 may transmit and receive a control message and user data to and from a 5GC 352 via an NR base station 350.

According to various embodiments, the electronic device 101 may be registered in at least one of the EPC 342 or the 5GC 352, and transmit and receive a control message.

According to various embodiments, the EPC 342 or the 5GC 352 may interwork and manage a communication of the electronic device 101. For example, mobility information of the electronic device 101 may be transmitted and received via an interface between the EPC 342 and the 5GC 352.

As described above, dual connectivity via the LTE base station 340 and the NR base station 350 may be referred to as E-UTRA new radio dual connectivity (EN-DC).

Hereinafter, a structure of an electronic device 101 according to various embodiments will be described in detail with reference to FIGS. 4A, 4B, 4C, 8, 9, 10, 11, and 12. In each drawing of example embodiments to be described later, one communication processor 260 and one RFIC 410 are shown as being connected to at least one RFFE 431 and 432, but various embodiments to be described later are not limited thereto. For example, in various embodiments to be described below, a plurality of communication processors 212 and 214 and/or a plurality of RFICs 222, 224, 226, and 228 may be connected to a plurality of RFFEs 232, 234, and 236, respectively.

Figure 4A:
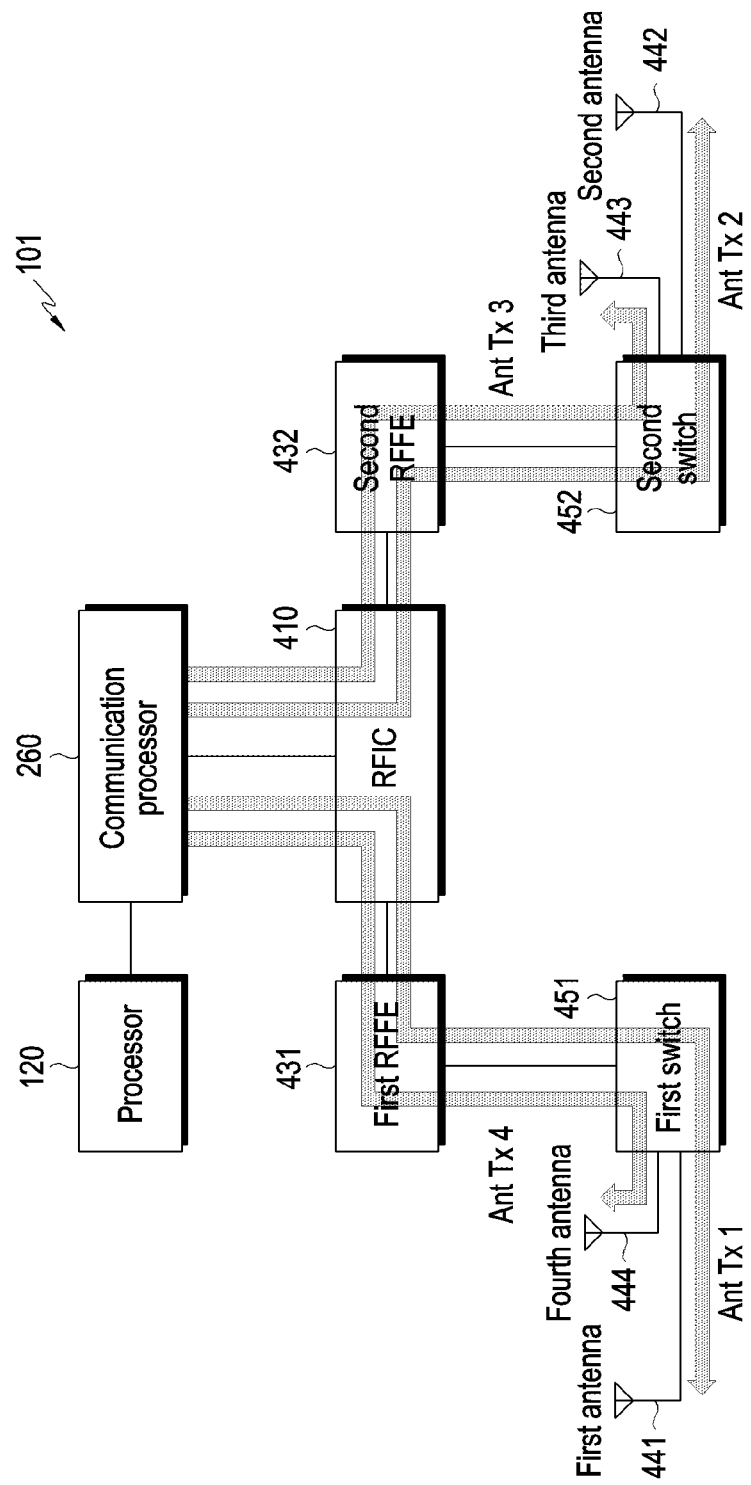
FIG. 4A shows a block diagram illustrating an example electronic device according to various embodiments.
Figure 4B:
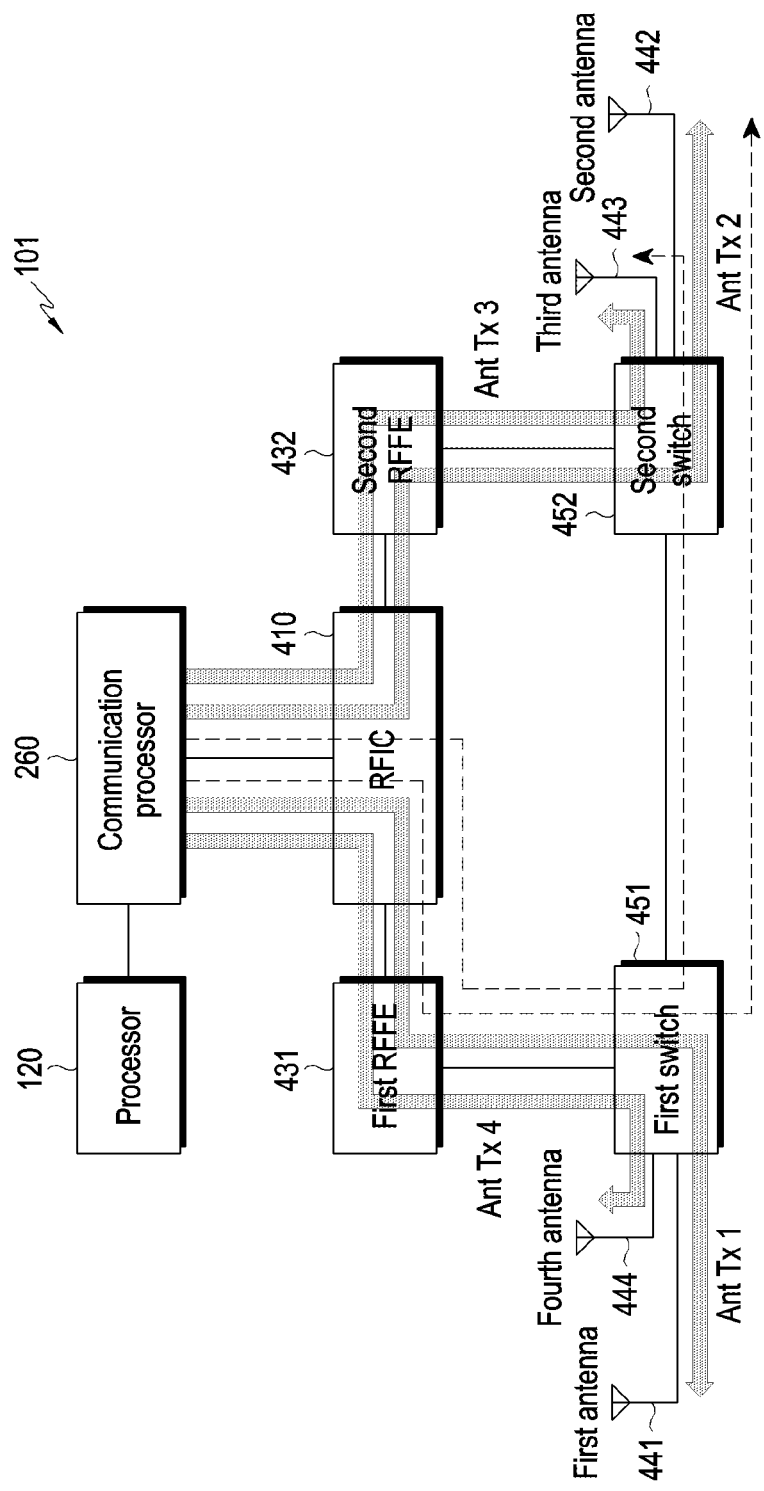
FIG. 4B shows a block diagram illustrating an example electronic device according to various embodiments.

FIG. 4A and FIG. 4B show a block diagram illustrating an electronic device according to various embodiments.

Referring to FIG. 4A, an electronic device (e.g., an electronic device 101 in FIG. 1) according to various embodiments may include a processor 120, a communication processor 260, an RFIC 410, a first RFFE 431, a second RFFE 432, a first antenna 441, a second antenna 442, a third antenna 443, a fourth antenna 444, a first switch 451, or a second switch 452. For example, the first RFFE 431 may be disposed at a top in a housing of the electronic device 101, and the second RFFE 432 may be disposed lower than the first RFFE 431 within the housing of the electronic device 101. However, various embodiments of the present disclosure are not limited to the disposition locations as described above.

According to various embodiments, in a case of transmission, the RFIC 410 may convert a baseband signal generated by the communication processor 260 into a radio frequency (RF) signal which is used in a first communication network or a second communication network. For example, the RFIC 410 may transmit an RF signal used in the first communication network to the first antenna 441 or the fourth antenna 444 via the first RFFE 431 and the first switch 451. The RFIC 410 may transmit an RF signal used in the first communication network (e.g., a 5G network) or the second communication network (e.g., an LTE network) to the second antenna 442 or the third antenna 443 via the second RFFE 432 and the second switch 452. According to various embodiments, the RFIC 410 may transmit an RF signal which corresponds to the first communication network (e.g., the 5G network) to the first antenna 441 or the fourth antenna 444 via the first RFFE 431, and may transmit an RF signal which corresponds to the second communication network (e.g., the LTE network) to the second antenna 442 or the third antenna 443 via the second RFFE 432. According to an embodiment, the RFIC 410 may transmit an RF signal which corresponds to the first communication network (e.g., the 5G network) or an RF signal which corresponds to the second communication network (e.g., the LTE network) to the first antenna 441 or the fourth antenna 444 via the first RFFE 431, and transmit the same RF signal corresponding to the first communication network (e.g., the 5G network) or the second communication network (e.g., the LTE network) to the second antenna 442 or the third antenna 443 via the second RFFE 432, thereby operating as a multi-input multi-output (MIMO) antenna.

According to various embodiments, a transmission path from the RFIC 410 to the first antenna 441 via the first RFFE 431 and the first switch 451 may be referred to, for example, as a 'first antenna transmission path (Ant Tx 1)'. A transmission path from the RFIC 410 to the fourth antenna 444 via the first RFFE 431 and the first switch 451 may be referred to, for example, as a 'fourth antenna transmission path (Ant Tx 4)'.

According to various embodiments, in a case of transmission, the RFIC 410 may convert a baseband signal generated by the communication processor 260 into a radio frequency (RF) signal which is used in the first communication network or the second communication network. For example, the RFIC 410 may transmit the RF signal used in the first communication network or the second communication network to the second antenna 442 or the third antenna 443 via the second RFFE 432 and the second switch 452.

According to various embodiments, a transmission path from the RFIC 410 to the second antenna 442 via the second RFFE 432 and the second switch 452 may be referred to, for example, as a 'second antenna transmission path (Ant Tx 2)'. A transmission path transmitted from the RFIC 410 to the third antenna 443 via the second RFFE 432 and the second switch 452 may be referred to, for example, as a 'third antenna transmission path (Ant Tx 3)'.

According to various embodiments, in a case of reception, an RF signal may be received from the first communication network via the first antenna 441 or the fourth antenna 444, and the received RF signal may be transmitted to the communication processor 260 after passing through at least one RFIC. In addition, an RF signal may be received from the first communication network or the second communication network via the second antenna 442 or the third antenna 443, and the received RF signal may be transmitted to the communication processor 260 after passing through at least one RFIC.

According to various embodiments, the first communication network and the second communication network may be the same or different communication networks. For example, the first communication network may be a 5G network, and the second communication network may be a legacy network (e.g., an LTE network). If the first communication network is the 5G network, the first RFFE 431 may be designed to be suitable for processing a signal which corresponds to the 5G network, and the second RFFE 432 may be designed to be suitable for processing a signal which corresponds to the legacy network (e.g., the LTE network).

According to various embodiments, a frequency band of a signal transmitted via the first RFFE 431 and a frequency band of a signal transmitted via the second RFFE 432 may be the same, similar, or different. For example, the frequency band of the signal transmitted via the first RFFE 431 may be an N41 band (2.6 GHz) which is a frequency band of the 5G network, and the frequency band of the signal transmitted via the second RFFE 431 may be a B41 band (2.6 GHz) which is a frequency band of the LTE network. In this case, the first RFFE 431 and the second RFFE 432 may process a signal of the same or similar frequency band, but the first RFFE 431 may be designed to be capable of signal processing suitable for a characteristic of the 5G network, and the second RFFE 432 may be designed to be capable of signal processing suitable for a characteristic of the LTE network.

According to various embodiments, if the electronic device transmits a signal via one of the first antenna 441 and the fourth antenna 444 after passing through the first RFFE 431 and the first switch 451, and transmits a reference signal via the first antenna 441 and the fourth antenna 444, the electronic device uses one transmission antenna (Tx) and two reception antennas (Rx), so it may be referred to, for example, as '1T2R'.

According to various embodiments, if the electronic device transmits a signal via one of the second antenna 442 and the third antenna 443 after passing through the second RFFE 432 and the second switch 452, and transmits a reference signal via the second antenna 442 and the third antenna 443, the electronic device uses one transmission antenna (Tx) and two reception antennas (Rx), so it may be referred to, for example, as '1T2R'.

According to various embodiments, if the electronic device simultaneously transmits and receives data via the first RFFE 431 and the second RFFE 432, the electronic devices uses two transmit antennas (Tx) and four receive antennas (Rx), so it may be referred to, for example, as '2T4R'. The electronic device shown in FIG. 4A may operate with 1T2R or 2T4R according to various embodiments, so it may be referred to, for example, as an electronic device supporting '1T2R/2T4R'.

According to various embodiments, the communication processor 260 may control to transmit a reference signal (e.g., a sounding reference signal (SRS)) to which a base station of the first communication network refers for channel estimation to at least one antenna (the first antenna 441 or the fourth antenna 444) among a plurality of antennas in the first antenna group via the first RFFE circuit 431. According to various embodiments, the communication processor 260 may control to additionally transmit the reference signal to which the base station in the first communication network refers for the channel estimation to at least one antenna (the second antenna 442 or the third antenna 443) among a plurality of antennas in the second antenna group via the second RFFE circuit 432. When the electronic device transfers the reference signal via the first antenna 441, the second antenna 442, the third antenna 443, and the fourth antenna 444, the base station of the first communication network may receive the reference signal, and perform channel estimation based on the received reference signal. The base station of the first communication network may transmit a signal beamformed for the first antenna 441, the second antenna 442, the third antenna 443, and the fourth antenna 444. The electronic device may receive a signal transmitted from the base station of the first communication network via the first antenna 441, the second antenna 442, the third antenna 443, and the fourth antenna 444. The electronic device shown in FIG. 4A has been designed as an electronic device supporting '1T2R/2T4R', but according to various embodiments, the electronic device shown in FIG. 4A may operate with '1T4R' by receiving a signal from the base station of the first communication network via the first antenna 441, the second antenna 442, and the third antenna 443, and the fourth antenna 444. For example, when the electronic device 101 operates as '1T4R', the electronic device 101 may transmit a reference signal to the base station of the first communication network via the first antenna 441, the second antenna 442, the third antenna 443, and the fourth antenna 444.

According to various embodiments, although one RFIC 410 has been described as being connected to two RFFEs 431 and 432 to transmit a reference signal (e.g., an SRS) in FIG. 4A, above-described embodiments may also be applied to various types of structures in which at least one RFIC is connected to three or more RFFEs, and each RFFE is connected to at least one antenna.

Referring to FIG. 4B, an electronic device (e.g., an electronic device 101 in FIG. 1) according to various embodiments may include a processor 120, a communication processor 260, an RFIC 410, a first RFFE 431, a second RFFE 432, a first antenna 441, a second antenna 442, a third antenna 443, a fourth antenna 444, a first switch 451, or a second switch 452. For example, the first RFFE 431 may be disposed at a top in a housing of the electronic device 101, and the second RFFE 432 may be disposed lower than the first RFFE 431 within the housing of the electronic device 101. However, various embodiments of the present disclosure are not limited to the disposition locations as described above. In an embodiment in FIG. 4B to be described later, a description commonly applicable to FIG. 4A described above will not be repeated.

According to various embodiments, in a case of transmission, the RFIC 410 may convert a baseband signal generated by the communication processor 260 into a radio frequency (RF) signal which is used in a first communication network or a second communication network. For example, the RFIC 410 may transmit an RF signal used in the first communication network to the first antenna 441 or the fourth antenna 444 via the first RFFE 431 and the first switch 451. Further, the RFIC 410 may transmit an RF signal used in the first communication network to the second antenna 442 or the third antenna 443 via the first RFFE 431, the first switch 451, and the second switch 452. If the RF signal used in the first communication network is transmitted from the first RFFE 431 to the second antenna 442 or the third antenna 443 via the first switch 451 and the second switch 452, a transmit path becomes longer and the RF signal additionally passes through a switch, so relatively greater path loss may occur.

According to various embodiments, upon intending to transmit a reference signal (e.g., an SRS) to any one of the first antenna 441, the second antenna 442, the third antenna 443, or the fourth antenna 444 via the RFIC 410, the electronic device 101 may transmit the reference signal to at least one other antenna which is determined based on at least one of information related to strength of a received signal for each antenna (e.g., reference signal received power (RSRP), a received strength signal indicator (RSSI), and reference signal received quality (RSRQ)), path loss (PL), or whether a specific absorption rate (SAR) event occurs. For example, the electronic device 101 may adjust an amplitude and a phase of the reference signal based on an antenna set from the base station, and transmit a reference signal whose amplitude and phase are adjusted to the determined other antenna without transmitting the reference signal via the antenna set according to information received from the base station. A detailed description thereof will be provided with reference to FIGS. 8, 9, 10 and 11.

According to various embodiments, the RFIC 410 may transmit an RF signal which corresponds to the first communication network (e.g., an NR network) to the first antenna 441 or the fourth antenna 444 via the first RFFE 431, and may transmit an RF signal which corresponds to the second communication network (e.g., the LTE network) to the second antenna 442 or the third antenna 443 via the second RFFE 432. According to various embodiments, the RFIC 410 may transmit an RF signal which corresponds to the first communication network (e.g., the 5G network) or an RF signal which corresponds to the second communication network (e.g., the LTE network) to the first antenna 441 or the fourth antenna 444 via the first RFFE 431 and the first switch 451, and transmit the RF signal to the second antenna 442 or the third antenna 443 via the first RFFE 431, the first switch 451, and the second switch 452, thereby operating as a multi-input multi-output (MIMO) antenna. According to various embodiments, a transmission path from the RFIC 410 to the first antenna 441 via the first RFFE 431 and the first switch 451 may be referred to, for example, as a 'first antenna transmission path (Ant Tx 1)'. A transmission path from the RFIC 410 to the fourth antenna 444 via the first RFFE 431 and the first switch 451 may be referred to, for example, as a 'fourth antenna transmission path (Ant Tx 4)'. A transmission path from the RFIC 410 to the second antenna 442 via the first RFFE 431, the first switch 451, and the second switch 452 may be referred to, for example, as a 'second antenna transmission path (Ant Tx 2)'. A transmission path from the RFIC 410 to the third antenna 443 via the first RFFE 431, the first switch 451, and the second switch 452 may be referred to, for example, as a 'third antenna transmission path (Ant Tx 3)'.

According to various embodiments, in a transmission path in which a signal is transmitted from the RFIC 410 to the third antenna 443 or the fourth antenna 444 via the first RFFE 431, the first switch 451, and the second switch 452, relatively greater path loss may occur due to length of the transmission path and components (e.g., a switch) disposed on the corresponding transmission path. According to various embodiments, when transmitting a reference signal (e.g., an SRS), the electronic device 101 (e.g., the communication processor 260) may reduce path loss by changing a transmission path for the corresponding reference signal.

According to various embodiments, in a case of reception, an RF signal may be received from the first communication network via the first antenna 441 or the fourth antenna 444, and the received RF signal may be transmitted to the communication processor 260 after passing through at least one RFIC. In addition, an RF signal may be received from the first communication network or the second communication network via the second antenna 442 or the third antenna 443, and the received RF signal may be transmitted to the communication processor 260 after passing through at least one RFIC.

According to various embodiments, if the electronic device transmits a signal via one of the first antenna 441 and the fourth antenna 444 after passing through the first RFFE 431 and the first switch 451, and transmits a reference signal via the first antenna 441, the second antenna 442, the third antenna 443, and the fourth antenna 444, the electronic device may operate with '1T2R' or '1T4R'.

According to various embodiments, if the electronic device simultaneously transmits and receives data via the first RFFE 431 and the second RFFE 432, the electronic devices uses two transmit antennas (Tx) and four receive antennas (Rx) to transmit the reference signal, so it may be referred to, for example, as '2T4R'. The electronic device shown in FIG. 4B may operate with 1T4R or 2T4R according to various embodiments, so it may be referred to, for example, as an electronic device supporting '1T4R/2T4R'.

According to various embodiments, the communication processor 260 may control to transmit a reference signal (e.g., a sounding reference signal (SRS)) to which a base station of the first communication network refers for channel estimation via the first antenna 441, the second antenna 442, the third antenna 443, and the fourth antenna 443 if the electronic device 101 operates as 1T4R. When the electronic device transfers the reference signal via the first antenna 441, the second antenna 442, the third antenna 443, and the fourth antenna 444, the base station of the first communication network may receive the reference signal, and perform channel estimation based on the received reference signal. The base station of the first communication network may transmit a signal beamformed for the first antenna 441, the second antenna 442, the third antenna 443, and the fourth antenna 444. The electronic device may receive a signal transmitted from the base station of the first communication network via the first antenna 441, the second antenna 442, the third antenna 443, and the fourth antenna 444. According to various embodiments, the electronic device shown in FIG. 4B may operate with '1T4R' by receiving a signal from the base station of the first communication network via the first antenna 441, the second antenna 442, and the third antenna 443, and the fourth antenna 444. For example, when the electronic device 101 operates as '1T4R', the electronic device 101 may transmit a reference signal to the base station of the first communication network via the first antenna 441, the second antenna 442, the third antenna 443, or the fourth antenna 444.

As shown in FIG. 4B, when the electronic device operates as '1T4R', the communication processor 260 may transmit a reference signal to which the base station of the first communication network refers for channel estimation to the first antenna 441, the second antenna 442, the third antenna 443, or the fourth antenna 444 via to the RFIC 410. According to a comparative example, as described above, in a transmission path transmitted from the RFIC 410 to the third antenna 443 or the fourth antenna 444 via the first RFFE 431, the first switch 451, and the second switch 452, relatively greater path loss may occur due to length of the transmission path and components (e.g., a switch) disposed on the transmission path.

According to various embodiments, upon transmitting the reference signal to the second antenna 442 and/or the third antenna 443 via the RFIC 410, the electronic device (e.g., the communication processor 260) may control to transmit the reference signal via the first antenna 441 or the fourth antenna 444 after passing through the first switch 451 without transmitting the reference signal via the first RFFE 431, the first switch 451, and the second switch 452 from the RFIC 410. A detailed description of various embodiments of changing an antenna for transmitting the reference signal will be described later.

According to various embodiments, although one RFIC 410 has been described as being connected to two RFFEs 431 and 432 to transmit a reference signal in FIG. 4B, it may also be applied to various types of structures in which at least one RFIC is connected to three or more RFFEs, and each RFFE is connected to at least one antenna (e.g., one or three or more antennas).

Figure 4C:
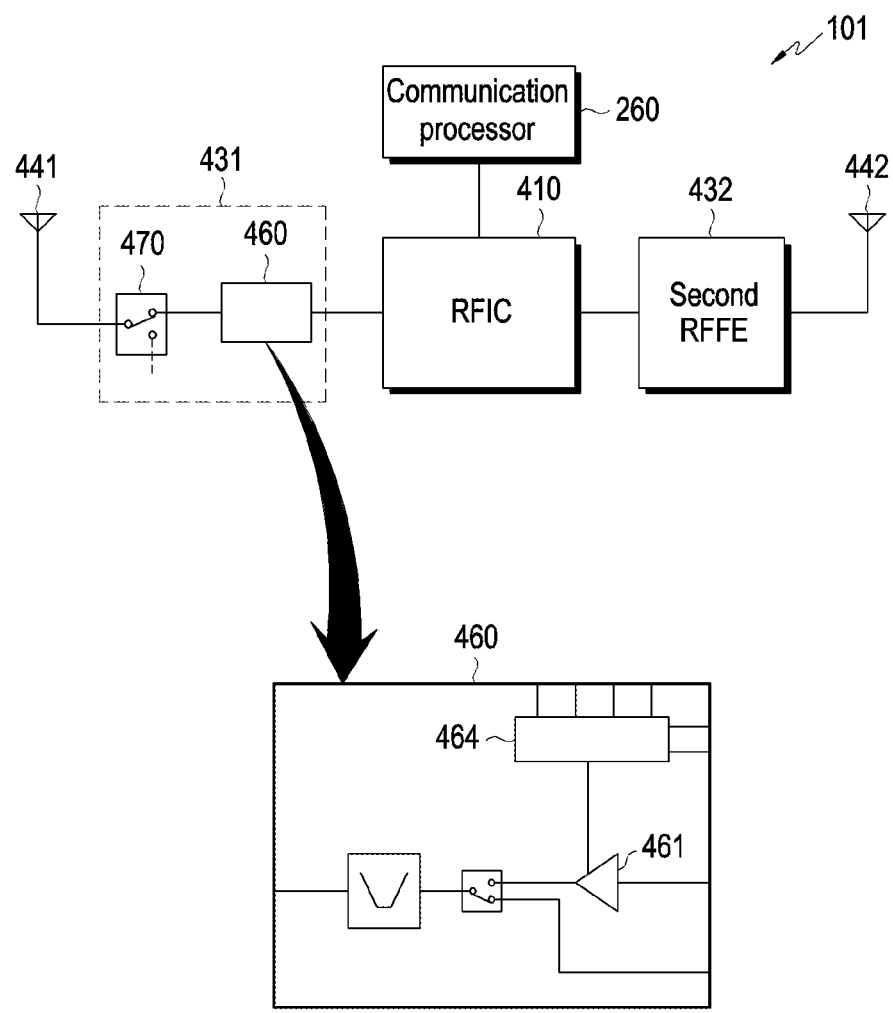
FIG. 4C shows a block diagram illustrating an example electronic device according to various embodiments.

FIG. 4C shows a detailed block diagram illustrating an electronic device according to various embodiments. Referring to FIG. 4C, an electronic device (e.g., an electronic device 101 in FIG. 1) according to various embodiments may include a communication processor 260, an RFIC 410, a first RFFE 431, a first antenna 441, a second RFEE 432, and a second antenna 442.

According to various embodiments, the first RFFE 431 may further include additional components different from the second RFFE 432 for signal processing suitable for a characteristic of a 5G network or for multi-band support. For example, the first RFFE 431 may include a front end module (FEM) 460 and a first single pole double throw (SPDT) switch 470.

According to various embodiments, the FEM 460 may include a power amplifier (PA) 461 and a PA envelope tracking IC (ET IC) 464. According to various embodiments, the PA ET IC 464 may be included inside the FEM 460 as shown in FIG. 4C or connected to the FEM 460 from the outside of the FEM 460. The PA ET IC 464 may control Vcc of the PA 461 under the control of the communication processor 260 or the RFIC 410.

Figure 5A:
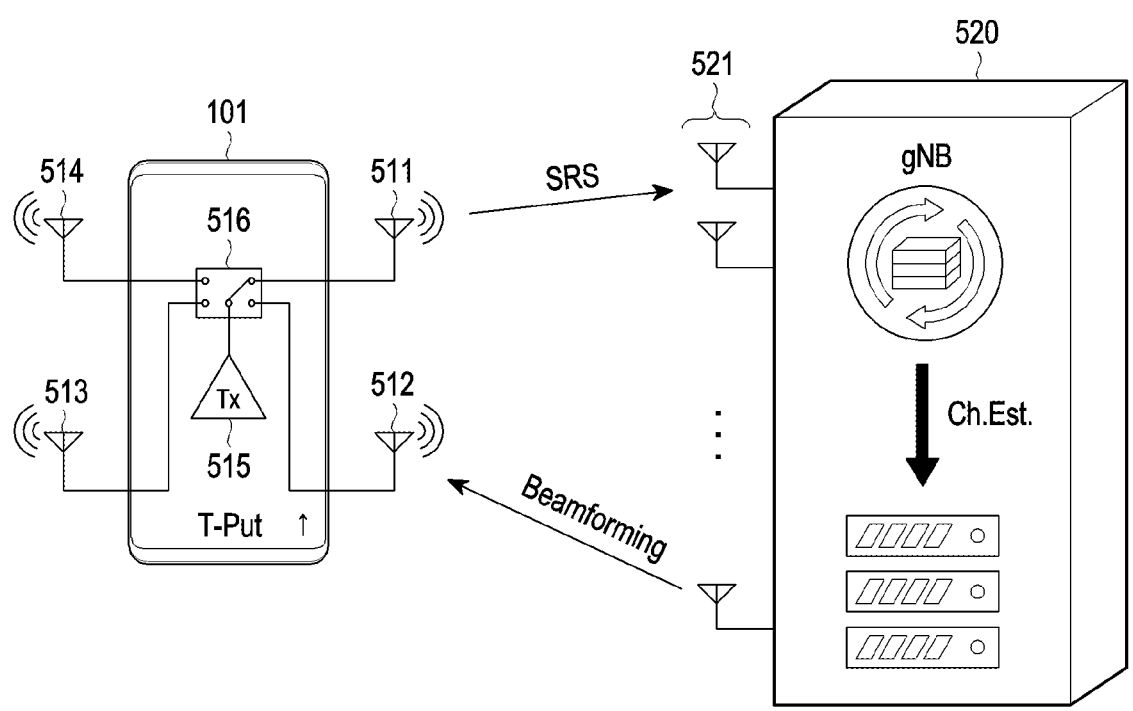
FIGS. 5A and 5B are diagrams illustrating reference signal transmit in an example electronic device according to various embodiments.
Figure 5B:
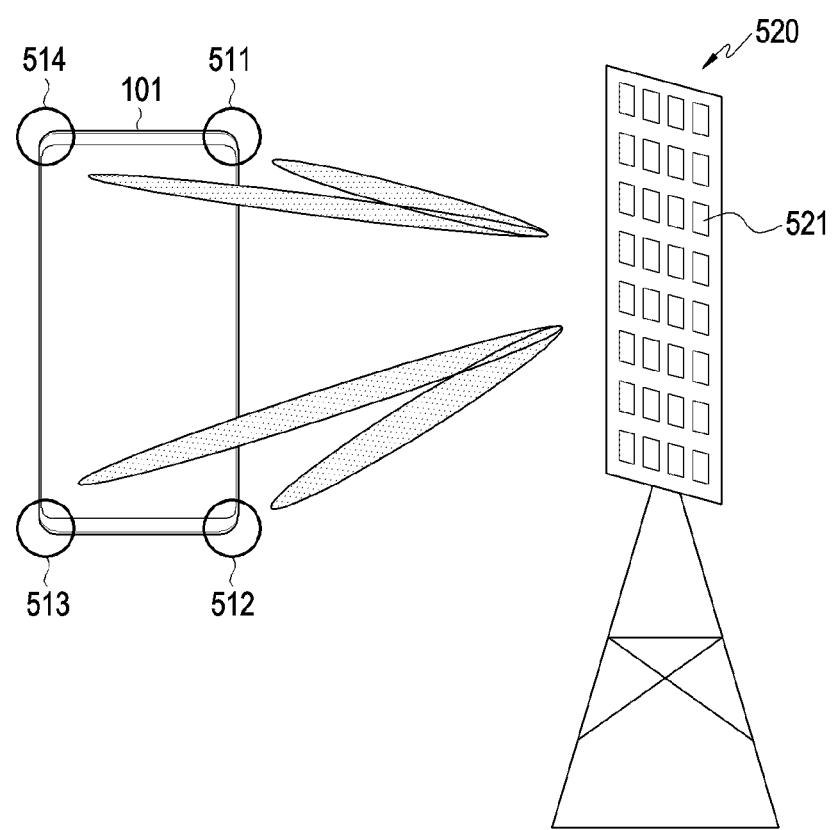

FIGS. 5A and 5B are diagrams illustrating reference signal transmit in an example electronic device according to various embodiments. Referring to FIG. 5A, an electronic device 101 (e.g., an electronic device 101 in FIG. 1) may transmit a reference signal (e.g., an SRS) via four antennas (e.g., a first antenna 511, a second antenna 512, and a third antenna 513, or a fourth antenna 514). For example, the electronic device 101 may amplify the reference signal via at least one power amplifier (PA) 515, and transmit an amplified reference signal to the first antenna 511, the second antenna 512, the third antenna 513, or the fourth antenna 514 via at least one switch 516. A reference signal (e.g., an SRS) transmitted via each antenna (e.g., the first antenna 511, the second antenna 512, the third antenna 513, or the fourth antenna 514) of the electronic device 101 may be received via each antenna 521 of a base station 520 (e.g., a gNB).

According to various embodiments, the electronic device 101 may transfer, via another antenna (e.g., the first antenna 511), a reference signal to be transmitted via a specific antenna (e.g., the second antenna 512, the third antenna 513, or the fourth antenna 514), and a detailed description thereof will be described in detail with reference to FIGS. 8, 9, 10, 11, and 12.

According to various embodiments, the base station 520 may receive a reference signal transmitted from the electronic device 101, and estimate a channel for each antenna (e.g., the first antenna 511, the second antenna 512, the third antenna 513, or the fourth antenna 514) of the electronic device 510 from the received reference signal. The base station 520 may transmit a beamformed signal to each antenna of the electronic device 101 based on the channel estimation.

In FIG. 5A, for convenience of a description, the power amplifier 515 and the switch 516 are shown as each being one in number, and as being connected to a plurality of antennas (the first antenna 511, the second antenna 512, the third antenna 513, or the fourth antenna 514), however, it is not limited thereto. For example, the electronic device 101 may further include components included in an electronic device 101 shown in FIG. 4A or 4B.

Referring to FIG. 5B, the base station 520 may transmit the beamformed signal via an array antenna 521 including a plurality of (e.g., 32) antennas. The signal transmitted from the base station 520 may be received via each antenna (e.g., the first antenna 511, the second antenna 512, the third antenna 513, or the fourth antenna 514) of the electronic device 101, and as shown in FIG. 5B, the signal may be received in the form of a beam directed to each antenna (e.g., the first antenna 511, the second antenna 512, the third antenna 513, or the fourth antenna 514) of the electronic device 101 by beamforming of the base station 520.

As shown in FIGS. 5A and 5B, when the electronic device 101 transfers a reference signal (e.g., an SRS) through a plurality of transmission paths, the base station 520 may identify a channel environment with each antenna (e.g., the first antenna 511, the second antenna 512, the third antenna 513, or the fourth antenna 514) of the electronic device 101 to perform beamforming, and as a result thereof, reference signal received power (RSRP) and/or a signal to noise ratio (SNR) of a downlink channel may be improved. When the RSRP and/or the SNR of the downlink channel are improved, a rank index (RI) or a channel quality indicator (CQI) for the corresponding electronic device may become higher. The base station 520 may allocate a high rank or modulation and code schemes (MCS) to the corresponding electronic device 101 based on an improved performance of the electronic device 101, so performance (e.g., throughput (T-put)) of the electronic device 101 may be improved.

According to various embodiments, the base station 520 may use a downlink reference signal for downlink channel estimation. For example, when the base station 520 transfers the downlink reference signal to the electronic device 101, the electronic device 101 may receive the downlink reference signal transmitted from the base station 520 to perform channel estimation. The electronic device 101 may transmit a result of the channel estimation to the base station 520, and the base station 520 may perform downlink beamforming by referring to the result of the channel estimation transmitted from the electronic device 101. According to various embodiments, if the base station 520 performs channel estimation based on a reference signal (e.g., an SRS) transmitted from the electronic device 101, channel estimation may be performed faster than channel estimation based on the downlink reference signal.

According to various embodiments, a base station (e.g., a base station (gNB)) of a first communication network or a base station (e.g., a base station (eNB)) of a second communication network may request various pieces of configuration information of an electronic device 101 by transmitting a UE Capability Enquiry message to the electronic device 101. For example, the base station (e.g., the base station (gNB)) of the first communication network or the base station (e.g., the base station (eNB)) of the second communication network may request information related to a reception antenna of the electronic device 101 via the UE Capability Enquiry message. The electronic device 101 may receive the UE Capability Enquiry message from the first communication network or the second communication network, and transmit a UE Capability Information message to the first communication network or the second communication network in response thereto. According to various embodiments, the UE Capability Information message may include information related to the reception antenna of the electronic device 101, such as 'supportedSRS-TxPortSwitch t1r4', corresponding to the contents of the UE Capability Enquiry message.

As the information related to the antenna is written as 'supportedSRS-TxPortSwitch t1r4', the first communication network may determine that the electronic device 101 may transmit a signal using four reception antennas, and for four antennas, include information about a time point at which a reference signal (e.g., an SRS) will be transmitted per antenna into an RRC Reconfiguration message to transmit the RRC Reconfiguration message.

Figure 6:
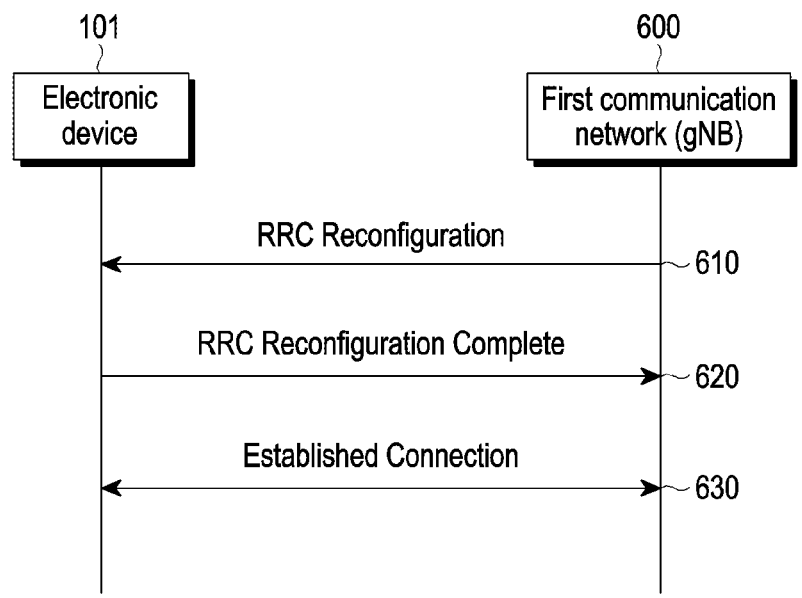
FIG. 6 is a signal flow diagram for describing a signal transmission and reception procedure between an example electronic device and a communication network according to various embodiments.

FIG. 6 is a signal flow diagram for describing a signal transmission and reception procedure between an electronic device and a communication network according to various embodiments. Referring to FIG. 6, an electronic device 101 may establish an RRC connection with a first communication network (e.g., a base station (gNB)) 600 via a random access channel (RACH) procedure.

According to various embodiments, in operation 610, a first communication network 600 may transmit an RRC Reconfiguration message to the electronic device 101. For example, the first communication network 600 may transmit the RRC Reconfiguration message in response to an RRC Request message transmitted by the electronic device 101. As described above, the RRC Reconfiguration message may include information about a time point at which the electronic device 101 will transmit a reference signal (e.g., an SRS) per antenna as shown in Table 1 below.

TABLE 1

| |
|---|
| perodicityAndOffset-p s120: 17 |
| perodicityAndOffset-p s120: 7 |
| perodicityAndOffset-p s120: 13 |
| perodicityAndOffset-p s120: 3 |
| nrofSymbols n1 |

Referring to the RRC Reconfiguration message, as written in "nrofSymbols n1.", it may be seen that time (duration) of transmitting an SRS may be determined by an allocated symbol. In addition, referring to the RRC Reconfiguration message, as written in "periodicityAndOffset-p s120:17", a first SRS is configured to be transmitted in the 17th slot while being transmitted once every 20 slots, as written in "periodicityAndOffset-p s120:7", a second SRS is configured to be transmitted in the 7th slot while being transmitted once every 20 slots, as written in "periodicityAndOffset-p s120:13", a third SRS is configured to be transmitted in the 13th slot while being transmitted once every 20 slots, and as written in "periodicityAndOffset-p s120:3", and a fourth SRS is configured to be transmitted in the third slot while being transmitted once every 20 slots.

According to various embodiments, the electronic device 101 may transmit four SRSs via each antenna at different time in every 20 slots according to the configuration of the RRC Reconfiguration. A size of the one slot may be determined by subcarrier spacing (SCS). For example, when the SCS is 30 KHz, a time interval of one slot may be 0.5 ms, and a time interval of 20 slots may be 10 ms. Accordingly, the electronic device 101 may repeatedly transmit an SRS at different time via each antenna every 10 ms period. According to various embodiments, one slot may include 14 symbols, and may have a symbol duration (or symbol enable time) of 0.5 ms*1/14=35 μs (0.035 ms) assuming that one symbol is allocated for one SRS transfer.

According to various embodiments, in operation 620, the electronic device 101 may transmit an RRC Reconfiguration Complete message to the first communication network 600. As the RRC Reconfiguration procedure is normally completed, in operation 630, the electronic device 101 and the first communication network 600 may complete RRC connection configuration.

Referring back to FIGS. 4A and 4B, according to various embodiments, the communication processor 260 and/or the RFIC 410 may transmit a reference signal at different time every time period (e.g., 10 ms) set through each antenna transmission path (e.g., a first antenna transmission path, a second antenna transmission path, a third antenna transmission path, and a fourth antenna transmission path) based on information about a transmit time point for a reference signal received from the first communication network 600 as described above.

Figure 7:
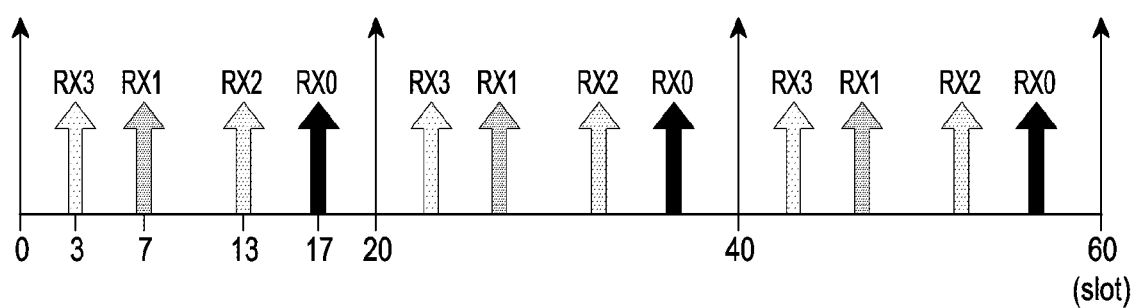
FIG. 7 is a diagram illustrating a transmit period for a reference signal according to various embodiments.

FIG. 7 is a diagram illustrating a transmit period for a reference signal according to various embodiments. Referring to FIG. 7, for example, every 10 ms, a first SRS may be transmitted via a first antenna 441 (RX0) in a 17th slot out of 20 slots, a second SRS may be transmitted via a second antenna 442 (RX1) in a 7th slot, a third SRS may be transmitted via a third antenna 443 (RX2) in a 13th slot, and a fourth SRS may be transmitted via a fourth antenna 444 (RX3) in a third slot.

According to various embodiments, an electronic device 101 may transmit a reference signal to be transmitted via a specific antenna (e.g., the second antenna 442, the third antenna 443, and the fourth antenna 444) via another antenna (e.g., the first antenna 441). For example, every 10 ms, the first SRS may be transmitted via the first antenna 441 (RX0) in the 17th slot out of 20 slots, the second SRS may be transmitted via the first antenna 441 (RX0) in the 7th slot, the third SRS may be transmitted via the first antenna 441 (RX0) in the 13th slot, and the fourth SRS may be transmitted via the first antenna 441 (RX0) in the third slot. At this time, the second SRS, the third SRS, and the fourth SRS are transmitted via an antenna (e.g., the first antenna 441 (RX0)) other than an antenna configured according to information received from a base station, so, the second SRS, the third SRS, and the fourth SRS may operate as if the second SRS, the third SRS, and the fourth SRS are transmitted from the configured antenna by adjusting an amplitude and/or a phase of the reference signal and transmitting it as in various embodiments to be described later. A detailed description thereof will be described in detail with reference to FIGS. 8, 9, 10, 11, and 12.

According to various embodiments, the reference signal may be a sounding reference signal (SRS) used for multi-antenna signal processing (e.g., multi input multi output (MIMO) or beamforming) through uplink channel state measurement, but it is not limited thereto. For example, in the above description or the following description, an SRS is taken as an example of a reference signal, but any type of uplink reference signal (e.g., a uplink demodulation reference signal (DM-RS)) transmitted from the electronic device 101 to the base station may also be included in a reference signal to be described later.

Figure 8:
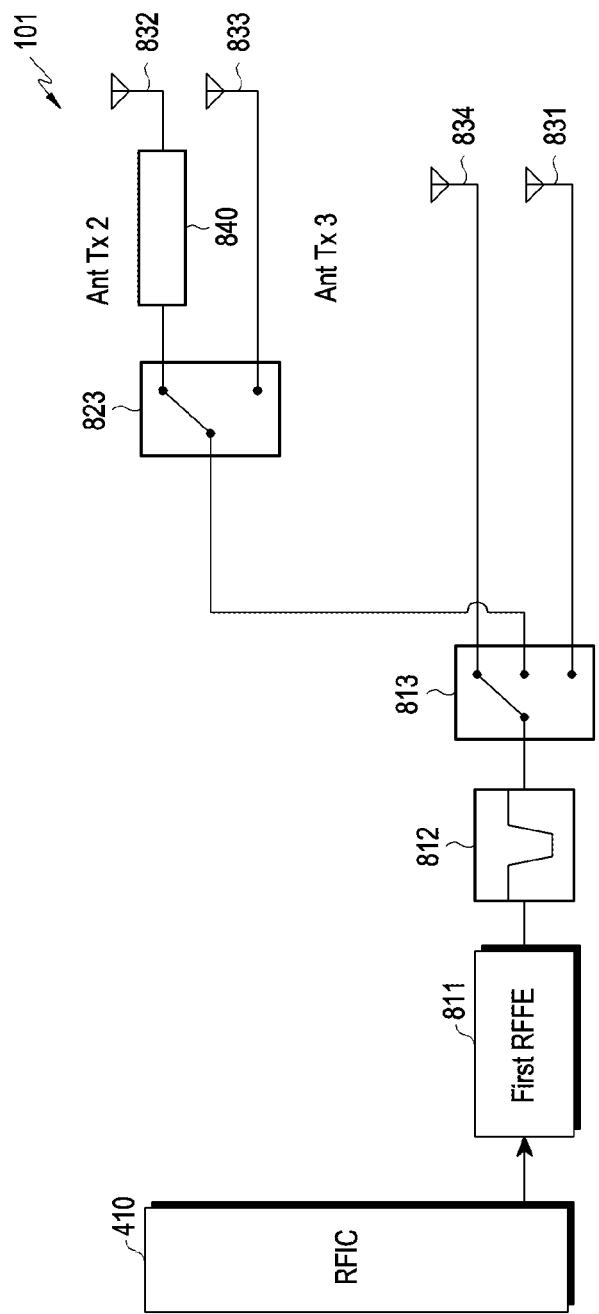
FIG. 8 is a circuit diagram illustrating a detailed circuit of an example electronic device according to various embodiments.

FIG. 8 is a circuit diagram illustrating a detailed circuit of an example electronic device according to various embodiments. Referring to FIG. 8, an electronic device 101 may include an RFIC 410, a first RFFE 811, a filter 812, a first switch 813 (e.g., an SP3T or an SP4T), a second switch 823, a first antenna 831, a second antenna 832, a third antenna 833, a fourth antenna 834, and a diplexer 840. As described above with reference to FIG. 4B, the electronic device 101 shown in FIG. 8 may operate with '1T4R'.

According to various embodiments, the RFIC 410, in a case of transmission, may convert a baseband signal generated by the communication processor 260 into a radio frequency (RF) signal used in the first communication network or the second communication network. For example, the RFIC 410 may transmit the RF signal used in the first communication network to the first antenna 831 or the fourth antenna 834 via the first RFFE 811 and the first switch 813. In addition, the RFIC 410 may transmit the RF signal used in the first communication network to the second antenna 832 or the third antenna 833 via the first RFFE 811, the first switch 813, and the second switch 823. According to various embodiments, if the electronic device transfers a reference signal to the second antenna 832 or the third antenna 833 via the first RFFE 811, the first switch 813, and the second switch 823, relatively large path loss may occur as described above in FIG. 4B. According to various embodiments, if the electronic device transfers a reference signal (e.g., an SRS) to the second antenna 832 or the third antenna 833 according to information received from the base station, the electronic device may adjust the reference signal to transmit it to the first antenna 831 or the fourth antenna 834.

According to various embodiments, at least one component (e.g., the filter 812) may be added between the first RFFE 811 and the first switch 813, and for example, the filter 812 may be a notch filter to prevent an NR band transmission signal from affecting a WIFI band signal (e.g., 2.4 GHz). The diplexer 840 may be added between the second switch 823 and the second antenna 832, and the diplexer 840 may perform Mid/High band/Ultra High band signal processing. According to various embodiments, the filter 812 and/or the diplexer 840 in FIG. 8 may be omitted or replaced with other components.

According to a comparison example, as described above, each antenna transmission path within the electronic device 101 may have different path loss because length of each transmission path and components disposed on the corresponding transmission path are different. For example, referring to FIG. 8, a transmit path from the first RFFE 811 to each antenna (e.g., the first antenna 831, the second antenna 832, the third antenna 833, and the fourth antenna 834) is different in the electronic device 101 supporting 1T4R, so path loss may occur differently. As illustrated in FIG. 8, path loss from the first RFFE 811 to the second antenna 832 and the third antenna 833 located at the bottom of the electronic device may be greater than path loss from the first RFFE 811 to the first antenna 831 and the fourth antenna 834 located at the top of the electronic device. For example, referring to FIG. 8, when transmitting a transmission signal from the first RFFE 811 to the second antenna 832 or the third antenna 833, relatively great path loss may occur due to length of a transmission path and components (e.g., a switch) disposed on the corresponding transmission path. For example, path loss from the second RFFE 821 to the first antenna 831 and the fourth antenna 834 may be relatively smaller than path loss from the first RFFE 811 to the second antenna 832 and the third antenna 833.

According to various embodiments, lost power corresponding to a transmit path from each RFFE (e.g., an RF connector port of the first RFFE 811) to each antenna (e.g., the first antenna 831, the second antenna 832, the third antenna 833, and the fourth antenna 834) may be referred to, for example, as 'transmission path loss (Tx path loss)', but the transmission path loss is not limited to the transmit path.

According to various embodiments, if the electronic device 101 operates as '1T4R', as described above, the electronic device may include information related to the antenna of the electronic device 101 as 'supportedSRS-TxPortSwitch t1r4' in Table 2 below into a UE Capability Information message to transmit the UE Capability Information message to the base station.

TABLE 2

SupportedBandCombinationList
{
bandList
{
  Srs-TxSwitch
  {
    supprtedSRS-TxPortSwitch notSupported
  }
  Srs-TxSwitch
  {
    supportedSRS-TxPortSwitch t1r4
  }
}
}

The base station may identify the information related to the antenna of the electronic device 101 included in the UE Capability Information message, and transmit information related to a transmit time point for a reference signal (e.g., an SRS) for four reception antennas via an RRC reconfiguration message. According to various embodiments, the electronic device may identify a reference signal transmit time point for each reception antenna (e.g., the first antenna 831, the second antenna 832, the third antenna 833, and the fourth antenna 834) from the base station, and transmit a reference signal via each antenna at the corresponding time point. For example, as shown in FIG. 7, every 10 ms, the first SRS may be transmitted via the first antenna 831 in the 17th slot out of 20 slots, the second SRS be transmitted via the second antenna 832 in the 7th slot, the third SRS may be transmitted via the third antenna 833 in the 13th slot, and the fourth SRS may be transmitted via the fourth antenna 834 in the third slot.

According to various embodiments, the electronic device may transmit the reference signal via each antenna (e.g., the first antenna 831, the second antenna 832, the third antenna 833, and the fourth antenna 834) at the transmit time point for the reference signal.

According to a comparative example for comparison with various embodiments, in a case of transmitting a reference signal from the first RFFE 811 to the second antenna 832 or the third antenna 833 via the first switch 813 and the second switch 823, path loss is relatively great, so it may be impossible to transmit a reference signal with desired transmission power.

According to various embodiments, upon intending to transmit a reference signal (e.g., an SRS) to any one of the first antenna 831, the second antenna 832, the third antenna 833, and the fourth antenna 834 via the RFIC 410, the electronic device 101 may adjust the reference signal to transmit it to at least one other antenna determined based on at least one of path loss (PL), whether a specific absorption rate (SAR) event occurs, and information (e.g., reference signal received power (RSRP), a received strength signal indicator (RSSI), and reference signal (RSRQ)) related to strength of a received signal for each antenna. For example, instead of transmitting the reference signal via an antenna set according to information received from the base station, the reference signal whose amplitude and phase are adjusted in consideration of the set antenna may be transmitted to the determined other antenna. According to various embodiments, the electronic device 101 may transmit a reference signal to be transmitted via a specific antenna (e.g., the second antenna 832, the third antenna 833, and the fourth antenna 834) via another antenna (e.g., the first antenna 831), and a detailed description thereof will be provided with reference to FIGS. 9, 10, 11, and 12.

Figure 9:
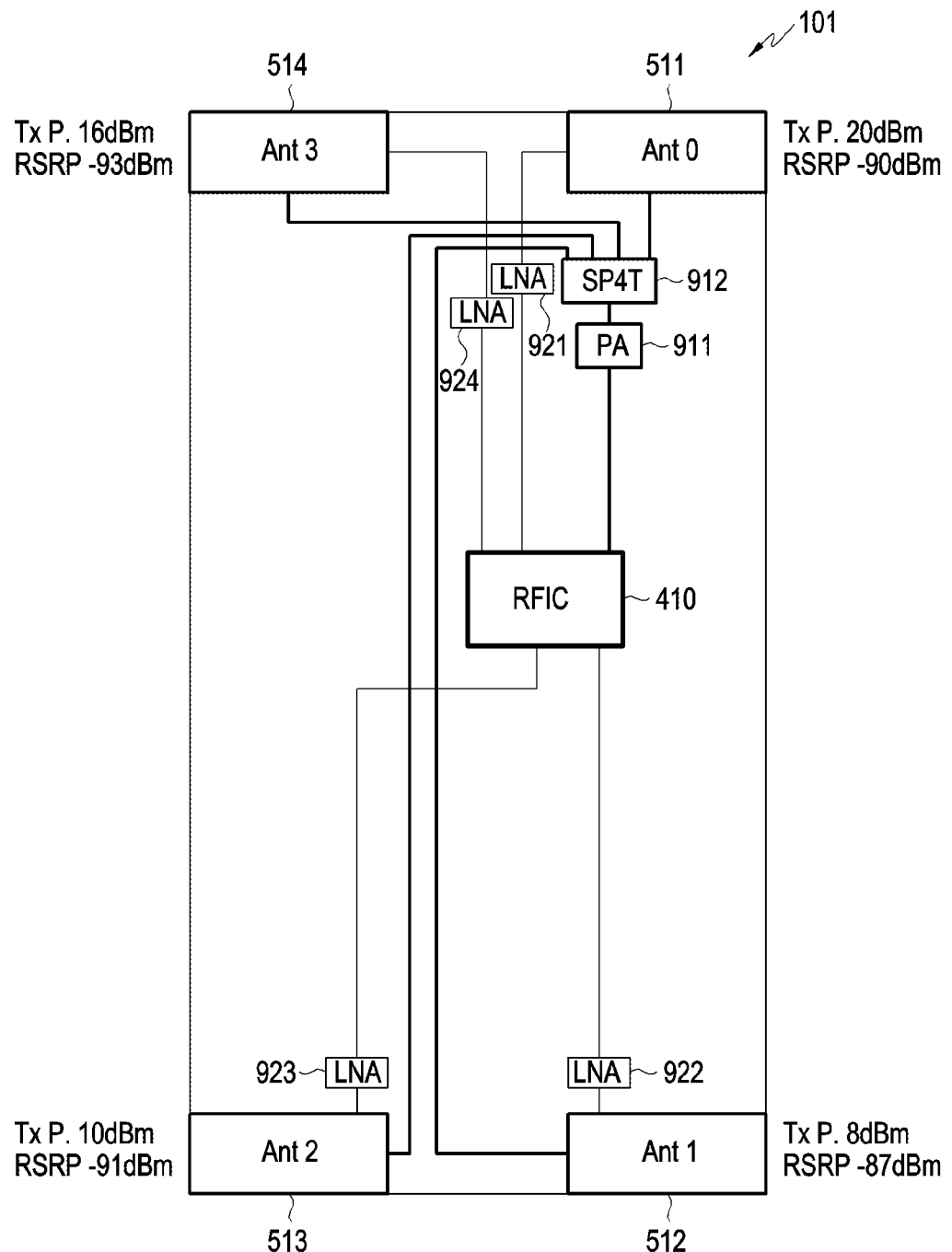
FIG. 9 is a block diagram illustrating a structure of an example electronic device according to various embodiments.

FIG. 9 is a block diagram illustrating a structure of an example electronic device according to various embodiments. Referring to FIG. 9, an electronic device 101 may transmit a transmission signal via an RFIC 410, a power amplifier (PA) 911, an SP4T 912, and a first antenna 511 (Ant 0). The electronic device 101 may receive a received signal via each of the first antenna 511 (Ant 0), a second antenna 512 (Ant 1), a third antenna 513 (Ant 2), and a fourth antenna 514 (Ant 3). The signal received via each antenna may be inputted to the RFIC 410 via low noise amplifiers (LNAs) 921, 922, 923, and 924. For example, it may be identified that a magnitude (e.g., magnitude of RSRP) of the signal received via the first antenna 511 is −90 dBm, a magnitude (e.g., magnitude of RSRP) of the signal received via the second antenna 512 is −87 dBm, a magnitude (e.g., magnitude of RSRP) of the signal received via the third antenna 513 is −91 dBm, and a magnitude (e.g., magnitude of RSRP) of the signal received via the fourth antenna 514 is −93 dBm.

According to various embodiments, as illustrated in FIG. 9, the electronic device 101 may operate with 1T4R by providing one transmission path and four reception paths via the four antennas, but various embodiments are not limited to this structure.

As described above, the electronic device 101 may transmit a reference signal via each antenna. According to various embodiments, assuming that the reference signal is an SRS, an SRS to be transmitted via the first antenna 511 (Ant 0) may be referred to, for example, as an 'SRS 0', an SRS to be transmitted via the second antenna 512 (Ant 1) may be referred to, for example, as an 'SRS 1', an SRS to be transmitted via the third antenna 513 (Ant 2) may be referred to, for example, as an 'SRS 2', and an SRS to be transmitted via the fourth antenna 514 (Ant 3) may be referred to, for example, as an 'SRS 3'.

Referring to FIG. 9, path loss, length of a line, and a type of a component are different for each transmission path, so power magnitude of a transmission signal transferable in each transmission path may be different. For example, it may be identified that power magnitude (Tx P.) of the transmission signal transferable via the first antenna 511 is 20 dBm, power magnitude (Tx P.) of the transmission signal transferable via the second antenna 512 is 8 dBm, power magnitude (Tx P.) of the transmission signal transferable via the third antenna 513 is 10 dBm, and power magnitude (Tx P.) of the transmission signal transferable via the fourth antenna 514 is 16 dBm.

For example, in the electronic device 101, the PA 911 and the SP4T 912 may be disposed close to the first antenna 511 for transmitting a transmission signal to secure uplink quality, so transmittable power magnitude of the second antenna 512, the third antenna 513, and the fourth antenna 514 may be relatively small. In addition, the first antenna 511 and the fourth antenna 514 are disposed at the top of the electronic device 101, while the second antenna 512 and the third antenna 513 are disposed at the bottom of the electronic device 101, so transmittable power magnitude of the second antenna 512 and the third antenna 513 may be relatively smaller. Accordingly, if the electronic device 101 transfers a reference signal via each antenna, magnitude of power transferable via each antenna may be different as shown in Table 3 below.

TABLE 3

|  | SRS Resource | | | |
| --- | --- | --- | --- | --- |
|  | SRS 0 | SRS 1 | SRS 2 | SRS 3 |
| Phase offset (Rad) | — | — | — | — |
| Amplitude offset (dB) | — | — | — | — |
| SRS transmit antenna | Ant 0 | Ant 1 | Ant 2 | Ant 3 |
| SRS Tx Power (dBm) | 20 | 8 | 10 | 16 |

As shown in <Table 3>, if the corresponding reference signal is transmitted via each antenna according to information received from a base station, a magnitude of transferable power in a specific antenna may be significantly decreased, unlike magnitude of a signal received via each antenna. In various embodiments, as shown in FIG. 10, it may be configured to transmit a reference signal via an antenna with relatively great magnitude of transferable power without transmitting the reference signal via an antenna according to information received from the base station.

Figure 10:
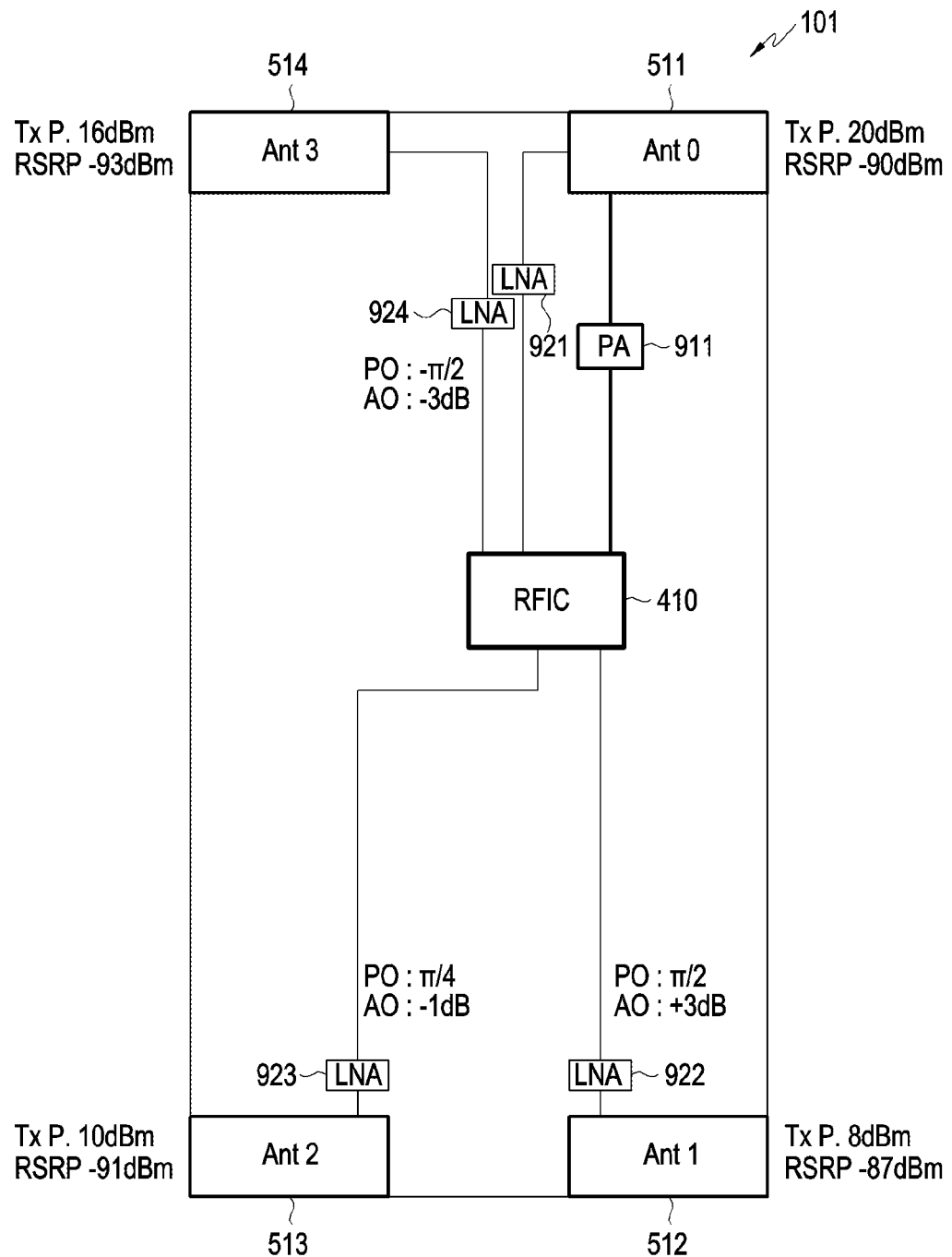
FIG. 10 is a block diagram illustrating a structure of an example electronic device according to various embodiments.

FIG. 10 is a block diagram illustrating a structure of an example electronic device according to various embodiments. Referring to FIG. 10, unlike FIG. 9, a reference signal configured to be transmitted to another antenna may be transmitted via an antenna which corresponds to a transmission path having a relatively small path loss (PL).

According to various embodiments, referring to FIG. 10, all reference signals to be transmitted via the remaining antennas may be transmitted via the first antenna 511 having relatively the smallest path loss (PL) and the greatest magnitude of transferable power.

For example, at a transmit time point for an SRS 0, an SRS may be transmitted via the first antenna 511 as configured, and at a transmit time point for an SRS 1, the SRS is not transmitted via the second antenna 512 as configured, and the SRS may be transmitted via the first antenna 511. At this time, according to various embodiments, an SRS which is adjusted in consideration of an amplitude offset and/or a phase offset between the first antenna 511 and the second antenna 512 may be transmitted via the first antenna 511 so that the SRS 1 may be received in the base station similarly to that transmitted via the second antenna 512. For example, it may be identified that strength of power (e.g., strength of RSRP) of a signal received via the first antenna 511 is −87 dBm, and strength of power (e.g., strength of RSRP) of a signal received via the second antenna 512 is −90 dBm, so an amplitude offset of the second antenna with respect to the first antenna is 3 dB(−87−(−90)). In addition, a phase offset of the second antenna with respect to the first antenna may be preset for each antenna path and stored in a memory (e.g., a memory within a communication processor 260), or may be identified by further considering a voltage standing-wave ratio (VSWR) fed back from each antenna. A detailed embodiment of the phase offset will be described below in connection with FIG. 12. Referring to FIG. 10, the phase offset of the second antenna with respect to the first antenna may be identified as n/2. According to various embodiments, the electronic device 101 may transmit the SRS adjusted based on the amplitude offset and/or the phase offset via the first antenna 511 at the transmit time point for the SRS 1.

According to various embodiments, at a transmit time point for an SRS 2, an SRS is not transmitted via the third antenna 513 as configured, and the SRS may be transmitted via the first antenna 511. At this time, according to various embodiments, an SRS which is adjusted in consideration of an amplitude offset and/or a phase offset between the first antenna 511 and the third antenna 513 may be transmitted via the first antenna 511 so that the SRS 2 may be received in the base station similarly to that transmitted via the third antenna 513. For example, it may be identified that strength of power (e.g., strength of RSRP) of a signal received via the first antenna 511 is −90 dBm, and strength of power (e.g., strength of RSRP) of a signal received via the third antenna 513 is −91 dBm, so an amplitude offset of the third antenna with respect to the first antenna is −1 dB(−91−(−90)). In addition, a phase offset of the third antenna with respect to the first antenna may be preset for each antenna path and stored in a memory (e.g., a memory within a communication processor 260), or may be identified by further considering a voltage standing-wave ratio (VSWR) fed back from each antenna. Referring to FIG. 10, the phase offset of the fourth antenna with respect to the first antenna may be identified as n/4. According to various embodiments, the electronic device 101 may transmit the SRS adjusted based on the amplitude offset and/or the phase offset via the first antenna 511 at the transmit time point for the SRS 3.

According to various embodiments, at a transmit time point for an SRS 3, an SRS is not transmitted via the fourth antenna 514 as configured, and the SRS may be transmitted via the first antenna 511. At this time, according to various embodiments, an SRS which is adjusted in consideration of an amplitude offset and/or a phase offset between the first antenna 511 and the fourth antenna 514 may be transmitted via the first antenna 511 so that the SRS 3 may be received in the base station similarly to that transmitted via the fourth antenna 514. For example, it may be identified that strength of power (e.g., strength of RSRP) of a signal received via the first antenna 511 is −90 dBm, and strength of power (e.g., strength of RSRP) of a signal received via the fourth antenna 514 is −93 dBm, so an amplitude offset of the fourth antenna with respect to the first antenna is −3 dB(−93−(−90)). In addition, a phase offset of the fourth antenna with respect to the first antenna may be preset for each antenna path and stored in a memory (e.g., a memory within a communication processor 260), or may be identified by further considering a voltage standing-wave ratio (VSWR) fed back from each antenna. Referring to FIG. 10, the phase offset of the third antenna with respect to the first antenna may be identified as −π/2. According to various embodiments, the electronic device 101 may transmit the SRS adjusted based on the amplitude offset and/or the phase offset via the first antenna 511 at the transmit time point for the SRS 3.

If all of the SRS 0, SRS 1, SRS 2, and SRS 3 are transmitted via the first antenna 511, transmittable power of the SRS may be 20 dBm, 23 dBm, 19 dBm, and 17 dBm, respectively, as shown in Table 4 below. For example, the transmittable power of the SRS 1 may increase from 8 dBm to 23 dBm, the transmittable power of the SRS 2 may increase from 10 dBm to 19 dBm, and the transmittable power of the SRS 2 may increase from 16 dBm to 17 dBm.

TABLE 4

|  | SRS Resource | | | |
| --- | --- | --- | --- | --- |
|  | SRS 0 | SRS 1 | SRS 2 | SRS 3 |
| Phase offset (Rad) | 0 | π/2 | π/4 | −π/2 |
| Amplitude offset (dB) | 0 | 3 | −1 | −3 |
| SRS transmit antenna | Ant 0 | Ant 0 | Ant 0 | Ant 0 |
| SRS Tx Power (dBm) | 20 | 23 | 19 | 17 |

Figure 11:
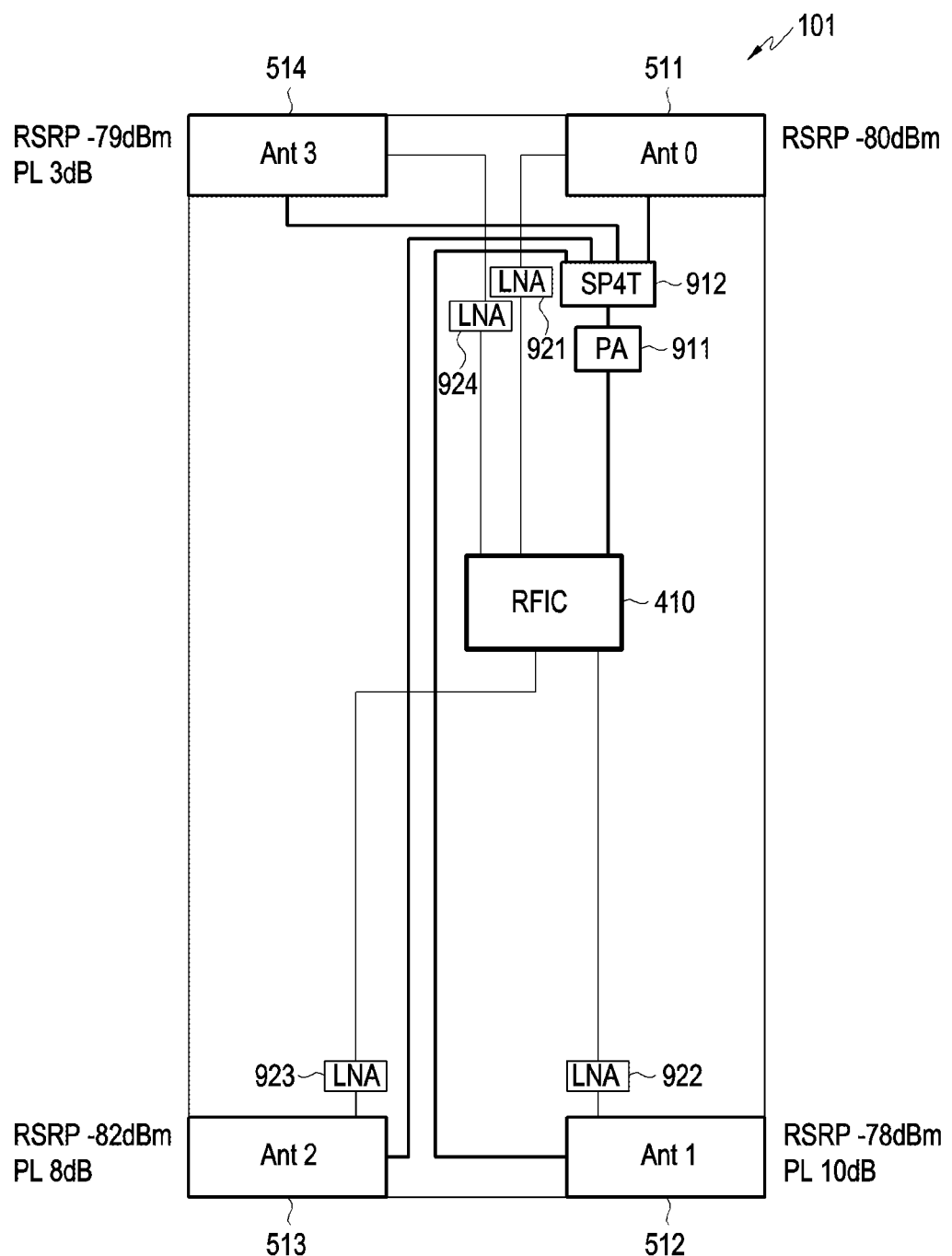
FIG. 11 is a block diagram illustrating a structure of an example electronic device according to various embodiments.

FIG. 11 is a block diagram illustrating a structure of an example electronic device according to various embodiments. Referring to FIG. 11, if an electronic device 101 operates as 1T4R, the electronic device 101 may transmit an SRS 0, an SRS 1, an SRS 2, and an SRS 4 as a reference signal (e.g., an SRS) via at least one other antenna. Referring to FIG. 11, it may be assumed that path loss (PL) of a transmission path corresponding to a first antenna 511 is 0 dB, it may be assumed path loss of a transmission path corresponding to a second antenna 512 is 10 dB, it may be assumed path loss of a transmission path corresponding to a third antenna 513 is 8 dB, and it may be assumed that path loss of a transmission path corresponding to a fourth antenna 514 may be assumed to be 3 dB. In addition, it may be identified that magnitude (e.g., magnitude of RSRP) of a signal received via the first antenna 511 is −80 dBm, magnitude (e.g., magnitude of RSRP) of a signal received via the second antenna 512 is −78 dBm, magnitude (e.g., magnitude of RSRP) of a signal received via the third antenna 513 is −82 dBm, and magnitude (e.g., magnitude of RSRP) of a signal received via the fourth antenna 514 is −79 dBm. According to various embodiments, if the electronic device 101 operates as 1T4R, the electronic device 101 may select not only one but also two or three antennas for SRS transfer. For example, as illustrated in FIG. 11, the first antenna 511 may be selected as an antenna for SRS transfer. According to various embodiments, the antenna selection may be determined by considering strength (e.g., RSRP) and path loss (PL) of a signal received via each antenna. Referring to Table 5 below, it may be identified that a difference between RSRP and PL for the first antenna 511 is −80 dBm (−80−0), a difference between RSRP and PL for the second antenna 512 is −88 dBm (−78−10), a difference between RSRP and PL for the third antenna 513 is −90 dBm (−82−8), and a difference between RSRP and PL for the fourth antenna 514 is −82 dBm (−79−3).

TABLE 5

|  | SRS Resource | | | |
| --- | --- | --- | --- | --- |
|  | SRS 0 | SRS 1 | SRS 2 | SRS 3 |
| Path loss (PL) (dB) | 0 | 10 | 8 | 3 |
| RSRP (dBm) | −80 | −78 | −82 | −79 |
| Value for antenna selection RSRP − PL | −80 | −88 | −90 | −82 |
| SRS transmit antenna | Ant 0 | Ant 0 | Ant 0 | Ant 0 |
| Amplitude offset RSRP (i) − RSRP (selected antenna) + PL (selected antenna) | 0 | 2 | −2 | 1 |

According to various embodiments, the first antenna 511 having the largest difference between RSRP and PL for each antenna may be configured as an antenna for SRS transfer. According to the configuration, all of the SRS 0, the SRS 1, the SRS 2, and the SRS 3 may be transmitted via the first antenna 511. At this time, the SRS 1, the SRS 2, and the SRS 3 may be transmitted as a reference signal adjusted in consideration of an amplitude offset between antennas. According to various embodiments, the amplitude offset may be determined based on RSRP of a signal received in a corresponding antenna, RSRP of a signal received in the antenna selected for SRS transfer, and path loss. For example, the amplitude offset may be determined as "RSRP (i)−RSRP (selected antenna)+PL (selected antenna)". If an amplitude offset for each SRS is calculated according to this method, as shown in Table 5, an amplitude offset for the SRS 1 may be 2, an amplitude offset for the SRS 2 may be −2, and an amplitude offset for the SRS 3 may be 1.

According to various embodiments, as shown in Table 6 below, the first antenna 511 and the fourth antenna 514, which are two antennas with the greatest difference between RSRP and PL for each antenna, may be configured as antennas for SRS transfer.

TABLE 6

|  | SRS Resource | | | |
| --- | --- | --- | --- | --- |
|  | SRS 0 | SRS 1 | SRS 2 | SRS 3 |
| Path loss (PL) (dB) | 0 | 10 | 8 | 3 |
| RSRP (dBm) | −80 | −78 | −82 | −79 |
| Value for antenna selection RSRP − PL | −80 | −88 | −90 | −82 |
| SRS transmit antenna | Ant 0 | Ant 3 | Ant 0 | Ant 3 |
| Amplitude offset RSRP (i) − RSRP (selected antenna) + PL (selected antenna) | 0 | 4 | −2 | 3 |

According to the configuration, the SRS 0 and the SRS 2 may be transmitted via the first antenna 511, and the SRS 3 and the SRS 1 may be transmitted via the fourth antenna 514. At this time, the SRS 1 and the SRS 2 may be transmitted as a reference signal adjusted in consideration of an amplitude offset between antennas. According to various embodiments, the amplitude offset may be determined based on RSRP of a signal received in a corresponding antenna, RSRP of a signal received in the antenna selected for SRS transfer, and path loss. For example, the amplitude offset may be determined as "RSRP (i)−RSRP (selected antenna)+PL (selected antenna)". If an amplitude offset for each SRS is calculated according to this method, as shown in Table 6, an amplitude offset for the SRS 1 may be 4, an amplitude offset for the SRS 2 may be −2, and an amplitude offset for the SRS 3 may be 3.

According to various embodiments, as shown in Table 7 below, the first antenna 511, the second antenna 512, and the fourth antenna 514, which are three antennas with the largest difference between RSRP and PL for each antenna, may be configured as antennas for SRS transfer.

TABLE 7

|  | SRS Resource | | | |
| --- | --- | --- | --- | --- |
|  | SRS 0 | SRS 1 | SRS 2 | SRS 3 |
| Path loss (PL) (dB) | 0 | 10 | 8 | 3 |
| RSRP (dBm) | −80 | −78 | −82 | −79 |
| Value for antenna selection RSRP − PL | −80 | −88 | −90 | −82 |
| SRS transmit antenna | Ant 0 | Ant 1 | Ant 0 | Ant 3 |
| Amplitude offset RSRP (i) − RSRP (selected antenna) + PL (selected antenna) | 0 | 10 | −2 | 4 |

According to the configuration, each of the SRS 0, the SRS 1, and the SRS 3 may be transmitted via an antenna configured according to information received from the base station, and the SRS 2 may be transmitted via the first antenna 511. At this time, the SRS 2 may be transmitted as a reference signal adjusted in consideration of an amplitude offset between antennas. According to various embodiments, the amplitude offset may be determined based on RSRP of a signal received in a corresponding antenna, RSRP of a signal received in the antenna selected for SRS transfer, and path loss. For example, the amplitude offset may be determined as "RSRP (i)−RSRP (selected antenna)+PL (selected antenna)". If an amplitude offset for each SRS is calculated according to this method, as shown in Table 7, an amplitude offset for the SRS 1 may be 10, an amplitude offset for the SRS 2 may be −2, and an amplitude offset for the SRS 3 may be 4.

Figure 12:
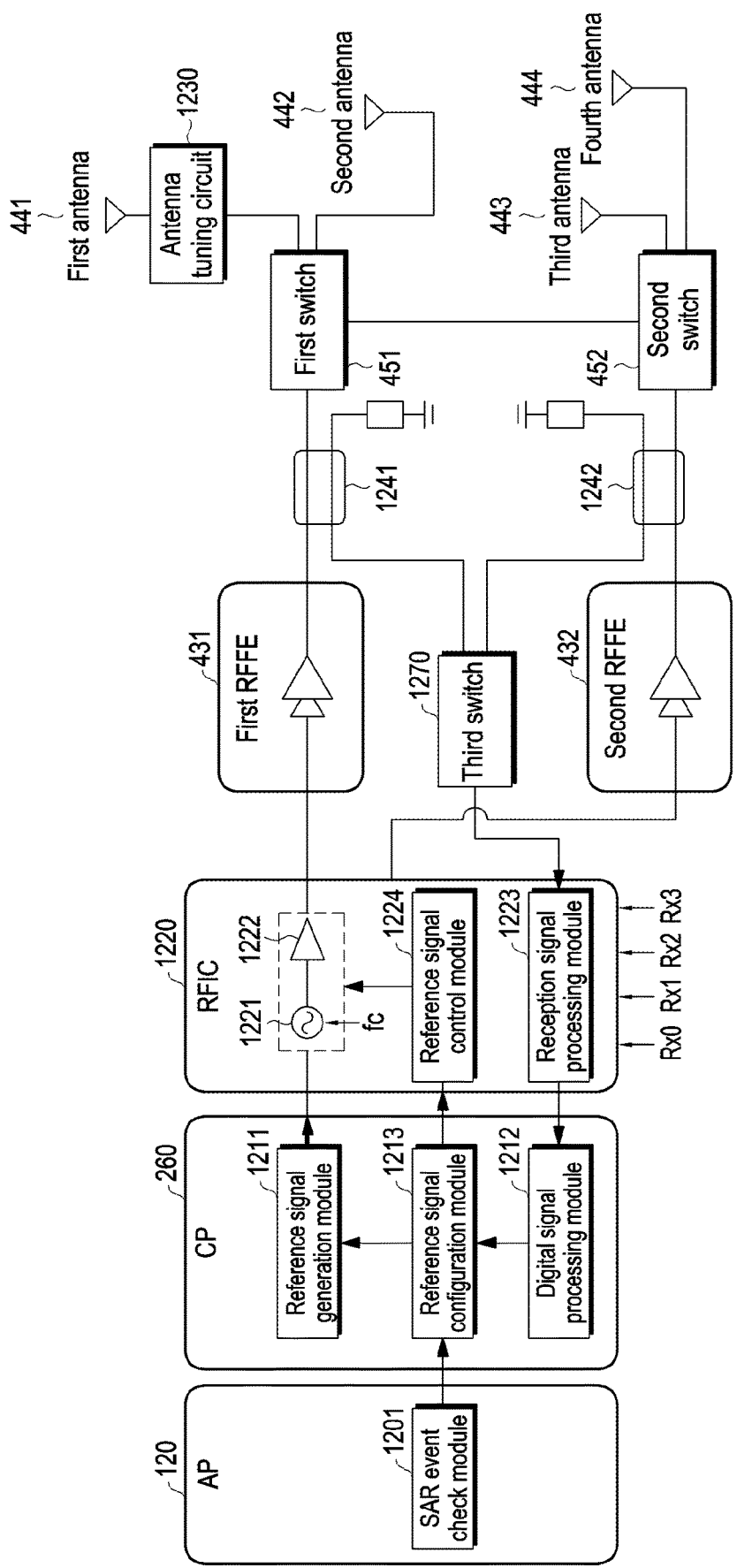
FIG. 12 is a block diagram illustrating an example electronic device according to various embodiments.

FIG. 12 is a block diagram illustrating an example electronic device according to various embodiments. Referring to FIG. 12, an electronic device (e.g., an electronic device 101 in FIG. 1) may include a processor 120 (hereinafter, referred to as an AP), a communication processor 260 (hereinafter, referred to as a CP), an RFIC 1220, a first RFFE 431, a second RFFE 432, a first coupler 1241, a second coupler 1242, a first switch 451, a second switch 452, a third switch 1270, a first antenna 441, a second antenna 442, a third antenna 443, a fourth antenna 444, and an antenna tuning circuit 1230. According to various embodiments, the CP 260 may include a reference signal generation module 1211, a reference signal configuration module 1213, and a digital signal processing module 1212. The RFIC 1220 may include a mixer 1221, an amplifier 1222, a reference signal control module 1224, and a reception signal processing module 1223.

According to various embodiments, the reception signal processing module 1223 in the RFIC 1220 may transmit signals (Rx 0, Rx 1, Rx 2, and Rx 3) received via each antenna to the digital signal processing module 1212 in the CP 260. The digital signal processing module 1212 in the CP 260 may convert the signal received via each antenna received from the reception signal processing module 1223 into a digital signal and provide the reference signal configuration module 1213 with the digital signal. The reference signal configuration module 1213 may configure at least one antenna via which an SRS will be transmitted by comparing the signals (RSRP) received via each antenna. According to various embodiments, the reference signal configuration module 1213 may configure at least one antenna via which the SRS will be transmitted as described above in FIG. 11 by further considering path loss of each transmission path which corresponds to each antenna in addition to the received signal.

The reference signal configuration module 1213 may control the first switch 451 or the second switch 452 or control the RFIC 1220 so that a corresponding SRS may be transmitted to the configured antenna at a transmit time point for each reference signal (e.g., an SRS 0, an SRS 1, an SRS 2, and an SRS 3).

The reference signal control module 1224 in the RFIC 1220 may adjust amplitude or a phase by controlling the mixer 1221 or the amplifier 1222 when the corresponding SRS is transmitted according to control information received from the reference signal configuration module 1213. For example, upon intending to transmit the SRS 1 via the first antenna 441 under the control of the reference signal configuration module 1213, the reference signal configuration module 1213 may adjust a gain of the amplifier 1222 based on an amplitude offset and control the mixer 1221 based on a phase offset. According to various embodiments, a preset value corresponding to each antenna may be stored in a memory as the phase offset. According to various embodiments, the phase offset may be further adjusted based on a VSWR calculated from a signal fed back via the first coupler 1241 or the second coupler 1242. For example, the signal fed back via the first coupler 1241 or the second coupler 1242 may be transmitted to the reception signal processing module 1223 in the RFIC 1220 via the third switch 1270. The CP 260 may identify a phase difference based on a VSWR for each antenna via the digital signal processing module 1212 and transmit it to the reference signal configuration module 1213. When a specific antenna to transmit an SRS is configured, the reference signal configuration module 1213 may further consider a phase difference based on the VSWR when determining a phase offset between antennas. According to various embodiments, if an antenna tuning circuit (e.g., the antenna tuning circuit 1230) is included in a front end of each antenna of the electronic device 101, the antenna tuning circuit 1230 may configure a tuner configuration value closest to the identified phase offset for more accurate antenna simulation.

According to various embodiments, upon detecting an SAR event, the AP 120 may transmit detected SRA event information from a SAR event check module 1201 to the CP 260. Upon receiving the SAR event information, the reference signal configuration module 1213 in the CP 260 may configure an SRS to be transmitted via an antenna corresponding to the corresponding SAR event to be transmitted via an antenna not corresponding to the SAR event. For example, when a grip event is detected, SAR backoff according to a SAR event may be applied to the second antenna 442 and the third antenna 443 disposed at the bottom of the electronic device 101. So, the reference signal configuration module 1213 may control the SRS 1 and the SRS 2 to be transmitted via the first antenna 441 or the fourth antenna 444 to which the SAR backoff is not applied, instead of via the second antenna 442 and the third antenna 443, respectively. For example, when detecting a proximity event according to a call reception, SAR backoff according to a SAR event may be applied to the first antenna 441 and the fourth antenna 444 disposed at the top of the electronic device 101. So, the reference signal configuration module 1213 may control the SRS 0 and the SRS 3 to be transmitted via the second antenna 442 or the third antenna 443 to which the SAR backoff is not applied, instead of via the first antenna 441 and the fourth antenna 444, respectively.

Table 8 below shows experimental results confirming an improvement effect through SRS path control in a strong electric field (e.g., when RSRP is −78 dBm).

TABLE 8

| Strong Signal | Normal Free condition | | |
|---|---|---|---|
| RSRP −78 dBm | Default 4 Path Transmit | 1 Path Transmit | Unit |
| 1st Trial | 854 | 1005 | Mbps |
| 2nd Trial | 815 | 1004 | |
| 3rd Trial | 896 | 858 | |
| 4th Trial | 775 | 1005 | |
| 5th Trial | 904 | 1009 | |
| Average | 848.8 | 976.2 | |
| Delta | | 15.01% | |

Referring to Table 8, it may be seen that if an SRS is transmitted via each antenna, average performance of 848.8 Mbps is confirmed, but if a plurality of SRSs are repeatedly transmitted via one antenna configured according to various embodiments, performance of 976.2 Mbps is confirmed.

Table 9 below shows experimental results confirming an improvement effect through SRS path control in a weak electric field (e.g., when RSRP is −97 dBm).

TABLE 9

| Weak Signal | Normal Free condition | | |
|---|---|---|---|
| RSRP −97 dBm | Default 4 Path Transmit | 1 Path Transmit | Unit |
| 1st Trial | 513 | 677 | Mbps |
| 2nd Trial | 747 | 827 | |
| 3rd Trial | 739 | 723 | |
| 4th Trial | 593 | 720 | |
| 5th Trial | 536 | 761 | |
| Average | 625.6 | 741.6 | |
| Delta | | 18.54% | |

Referring to Table 9, it may be seen that if an SRS is transmitted via each antenna, average performance of 625.6 Mbps is confirmed, but if a plurality of SRSs are repeatedly transmitted via one antenna configured according to various embodiments, performance of 741.6 Mbps is confirmed.

Table 10 below shows experimental results confirming an improvement effect through SRS path control in a SAR event (e.g., a grip event).

TABLE 10

| Strong Signal | Hand grip Event (bottom) | | |
|---|---|---|---|
| RSRP −82 dBm | Default 4 Path Transmit | 1 Path Transmit | Unit |
| 1st Trial | 491 | 650 | Mbps |
| 2nd Trial | 689 | 785 | |
| 3rd Trial | 532 | 716 | |
| 4th Trial | 599 | 734 | |
| 5th Trial | 569 | 688 | |
| Average | 576 | 714.6 | |
| Delta | | 24.06% | |

Referring to Table 10, it may be seen that if an SRS is transmitted via each antenna, average performance of 576

Mbps is confirmed, but if a plurality of SRSs are repeatedly transmitted via one antenna configured according to various embodiments, performance of 714.6 Mbps is confirmed.

Hereinafter, with reference to FIGS. 13 and 14, various example embodiments of controlling transmit for a reference signal in a CP 260 or an RFIC 410 of an example electronic device 101 according to various embodiments will be described in detail.

Figure 13:
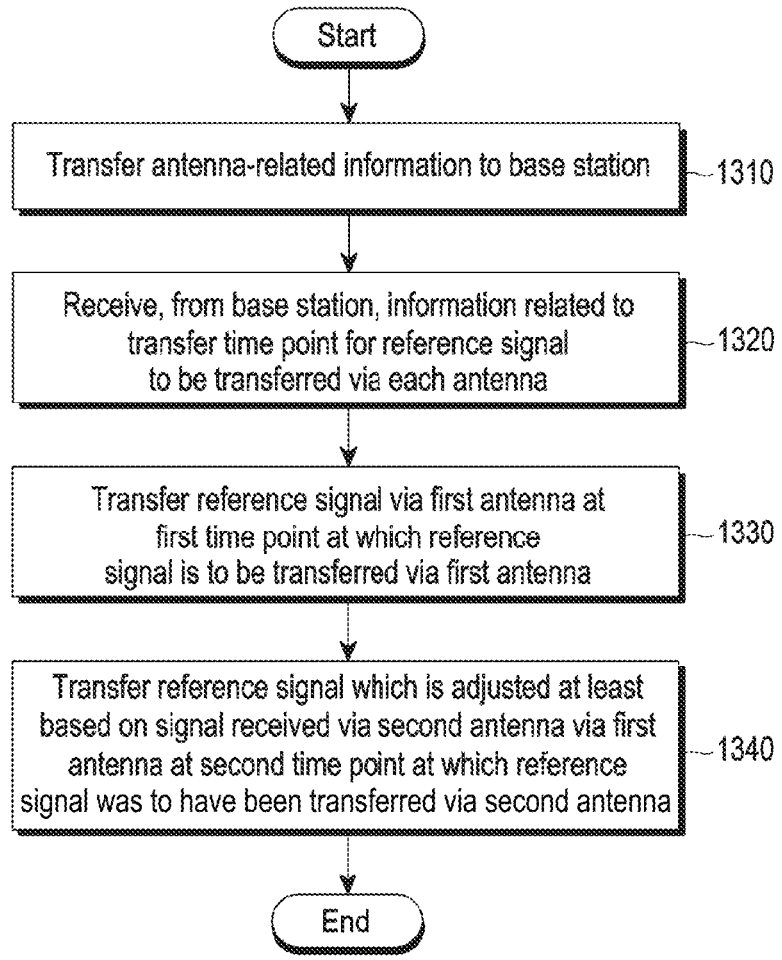
FIG. 13 is a flowchart for describing an example operating method of an example electronic device according to various embodiments.
Figure 14:
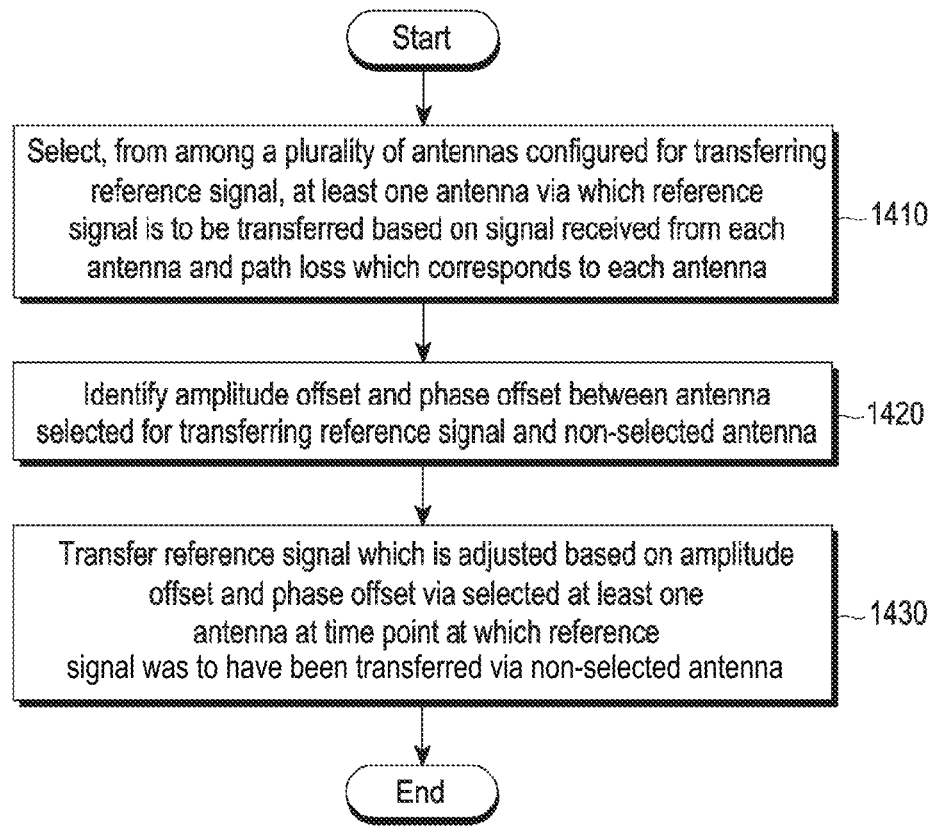
FIG. 14 is a flowchart for describing an example operating method of an example electronic device according to various embodiments.

FIGS. 13 and 14 show flowcharts for describing an example operating method of an example electronic device according to various embodiments. An operation in FIGS. 13 and 14 to be described below may be applied to an electronic device in any one of FIG. 4A, 4B, 4C, 8, 9, 10, 11, or 12 described above.

FIG. 13 is a flowchart for describing an example operating method of an example electronic device according to various embodiments. An electronic device (e.g., an electronic device 101 in FIG. 1) may include a communication processor 260, at least one radio frequency integrated circuit (RFIC) 410 connected to the communication processor, and a plurality of antennas 441, 442, 443, 444, 831, 832, 833, and 834 transmitting a signal corresponding to at least one communication network, each being connected via the at least one RFIC and at least one radio frequency front-end (RFFE) circuit 431, 432, and 811.

Referring to FIG. 13, according to various embodiments, in operation 1310, the electronic device 101 (e.g., a communication processor 260 of the electronic device) may control to transmit antenna-related information to a base station of a first communication network. According to various embodiments, if a first antenna group of the electronic device includes two antennas and a second antenna group includes two antennas, the antenna-related information may include information indicating that the electronic device supports one transmission antenna and four reception antennas. The antenna-related information may be included in a UE Capability Information message and transmitted. The UE Capability Information message may include information related to a reception antenna of the electronic device 101, such as 'supportedSRS-TxPortSwitch t1r4', according to the content of a UE Capability Enquiry message.

According to various embodiments, in operation 1320, the electronic device may receive information related to a reference signal transmit time point via each antenna from the base station.

According to various embodiments, in operation 1330, the electronic device may control the reference signal to be transmitted via a first antenna at a first time point at which the reference signal will be transmitted via the first antenna according to the received information.

According to various embodiments, in operation 1340, the electronic device may control a reference signal which is adjusted at least based on a signal received via the second antenna to be transmitted via the first antenna at a second time point at which the reference signal was to have been transmitted via the second antenna according to the received information.

FIG. 14 is a flowchart for describing an example operating method of an example electronic device according to various embodiments. An electronic device (e.g., an electronic device 101 in FIG. 1) may include a communication processor 260, at least one radio frequency integrated circuit (RFIC) 410 connected to the communication processor, and a plurality of antennas 441, 442, 443, 444, 831, 832, 833, and 834 transmitting a signal corresponding to at least one communication network, each being connected via the at least one RFIC and at least one radio frequency front-end (RFFE) circuit 431, 432, and 811.

Referring to FIG. 14, according to various embodiments, the electronic device 101 (e.g., a communication processor 260 of the electronic device) may transmit antenna-related information to a base station of a first communication network with 1T4R. For example, an electronic device supporting 1T2R/2T4R or an electronic device supporting 1T4R/2T4R may transmit antenna-related information to the base station of the first communication network with 1T4R.

The antenna-related information may be included in a UE Capability Information message and transmitted. The UE Capability Information message may include information related to a reception antenna of the electronic device 101, such as 'supportedSRS-TxPortSwitch t1r4', according to the content of a UE Capability Enquiry message.

According to various embodiments, the electronic device may receive information related to a reference signal transmit time point for each of four antennas from the base station.

According to various embodiments, in operation 1410, the electronic device may select at least one antenna via which a reference signal will be transmitted based on a signal received from each antenna among a plurality of antennas configured for transmit of the reference signal and path loss corresponding to each antenna.

According to various embodiments, in operation 1420, the electronic device may identify an amplitude offset and a phase offset between an antenna selected for reference signal transmit and an antenna not selected for reference signal transmit among the plurality of antennas configured for transmit of the reference signal.

According to various embodiments, in operation 1430, the electronic device may transmit a reference signal which is adjusted based on the identified amplitude offset and phase offset via the selected at least one antenna at a time point at which the reference signal was to have been transmitted via the non-selected antenna.

An electronic device according to any one of various example embodiments includes a communication processor, at least one radio frequency integrated circuit (RFIC) connected to the communication processor, at least one radio frequency front-end (RFFE) circuit connected to the at least one RFIC and configured to process a transmission signal, and a plurality of antennas connected via the at least one RFFE circuit, and the communication processor may control to transmit a reference signal to a base station via a first antenna among the plurality of antennas at a first time point at which the reference signal is to be transmitted via the first antenna, and control to transfer, to the base station via the first antenna, a reference signal which is adjusted at least based on a signal received via a second antenna among the plurality of antennas at a second time point at which the reference signal is to be transmitted via the second antenna.

The reference signal may include a sounding reference signal (SRS) used for multi-antenna signal processing via uplink channel state measurement.

According to various example embodiments, the communication processor may control to transmit antenna-related information to the base station.

According to various example embodiments, the communication processor may receive, from the base station, information related to a transmit time point for the reference signal which corresponds to each antenna among the plurality of antennas, and control to transmit each of a plurality of reference signals at different time via a configured antenna among a plurality of antennas based on the received information related to the transmit time point for the reference signal.

According to various example embodiments, the communication processor may control to transfer, to the base station via the first antenna at the second time point, a reference signal which is adjusted at least based on a difference between strength of a signal received via the second antenna and strength of a signal received via the first antenna.

According to various example embodiments, the communication processor may control to transfer, to the base station via the first antenna at the second time point, a reference signal which is adjusted further based on a difference between path loss (PL) of a signal transmitted via the second antenna and path loss of a signal transmitted via the first antenna.

According to various example embodiments, the communication processor may control to transfer, to the base station via the first antenna at the second time point, a reference signal whose amplitude is adjusted at least based on a signal received via the second antenna.

According to various example embodiments, the communication processor may control to transfer, to the base station via the first antenna at the second time point, a reference signal whose phase is adjusted at least based on a signal received via the second antenna.

An electronic device according to any one of various example embodiments includes a communication processor, at least one radio frequency integrated circuit (RFIC) connected to the communication processor, at least one radio frequency front-end (RFFE) circuit connected to the at least one RFIC and configured to process a transmission signal, and a plurality of antennas connected via the at least one RFFE circuit, and the communication processor may identify whether a specific absorption rate (SAR) event occurs, identify at least one antenna related to the SAR event among the plurality of antennas, and control to transmit a reference signal which is adjusted at least based on a signal received via at least one antenna related to the SAR event among the plurality of antennas to the base station via at least one antenna not related to the SAR event at a time point at which a reference signal is to be transmitted via the at least one antenna related to the SAR event.

According to various example embodiments, the reference signal may include a sounding reference signal (SRS) used for multi-antenna signal processing via uplink channel state measurement.

According to any one of various example embodiments, in a method to transmit a reference signal in an electronic device including a communication processor, at least one radio frequency integrated circuit (RFIC) connected to the communication processor, at least one radio frequency front-end (RFFE) circuit connected to the at least one RFIC and configured to process a transmission signal, and a plurality of antennas connected via the at least one RFFE circuit, the method may include transmitting a reference signal to a base station via a first antenna among the plurality of antennas at a first time point at which the reference signal is to be transmitted via the first antenna, and transmitting, to the base station via the first antenna, a reference signal which is adjusted at least based on a signal received via a second antenna among the plurality of antennas at a second time point at which the reference signal is to be transmitted via the second antenna.

According to various example embodiments, the reference signal may include a sounding reference signal (SRS) used for multi-antenna signal processing via uplink channel state measurement.

According to various example embodiments, the method may further include transmitting antenna-related information to the base station.

According to various example embodiments, the method may further include receiving, from the base station, information related to a transmit time point for the reference signal which corresponds to each antenna among the plurality of antennas, and transmitting each of a plurality of reference signals at different times via a configured antenna among a plurality of antennas based on the received information related to the transmit time point for the reference signal.

According to various example embodiments, the method may include transmitting, to the base station via the first antenna at the second time point, a reference signal which is adjusted at least based on a difference between strength of a signal received via the second antenna and strength of a signal received via the first antenna.

According to various example embodiments, the method may include controlling to transfer, to the base station via the first antenna at the second time point, a reference signal which is adjusted further based on a difference between path loss (PL) of a signal transmitted via the second antenna and path loss of a signal transmitted via the first antenna.

According to various example embodiments, the method may include controlling to transfer, to the base station via the first antenna at the second time point, a reference signal whose amplitude is adjusted at least based on a signal received via the second antenna.

According to various example embodiments, the method may include controlling to transfer, to the base station via the first antenna at the second time point, a reference signal whose phase is adjusted at least based on a signal received via the second antenna.

According to any one of various example embodiments, in a method to transmit a reference signal in an electronic device including a communication processor, at least one radio frequency integrated circuit (RFIC) connected to the communication processor, at least one radio frequency front-end (RFFE) circuit connected to the at least one RFIC and configured to process a transmission signal, and a plurality of antennas connected via the at least one RFFE circuit, the method may include identifying whether a specific absorption rate (SAR) event occurs, identifying at least one antenna related to the SAR event among the plurality of antennas, and transmitting a reference signal which is adjusted at least based on a signal received via at least one antenna related to the SAR event among the plurality of antennas to the base station via at least one antenna not related to the SAR event at a time point at which a reference signal is to be transmitted via the at least one antenna related to the SAR event.

According to various example embodiments, the reference signal may include a sounding reference signal (SRS) used for multi-antenna signal processing via uplink channel state measurement.

The electronic device according to various embodiments may be one of various types of electronic devices. The electronic devices may include, for example, a computer device, a portable communication device (e.g., a smartphone), a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with the disclosure, the term "module" may include a unit implemented in hardware, software, or firmware, or any combination thereof, and may interchangeably be used with other terms, for example, "logic," "logic block," "part," "circuitry", and/or the like. A module may be a single integral component, or a minimum unit or part thereof, adapted to perform one or two or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., an internal memory or an external memory) that is readable by a machine (e.g., a master device or a task performing device). For example, a processor of the device (e.g., the master device or the task performing device) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers, for example, to the storage medium being a tangible device, and does not include a signal (e.g., an electromagnetic wave), but this term does not differentiate between data being semi-permanently stored in the storage medium and the data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a communication processor including processing circuitry;
at least one radio frequency integrated circuit (RFIC) connected to the communication processor;
at least one radio frequency front-end (RFFE) circuit connected to the at least one RFIC and configured to process a transmission signal; and
a plurality of antennas connected via the at least one RFFE circuit,
wherein the communication processor is configured to:
identify a first transmit time point for transmitting a first reference signal via a first antenna among the plurality of antennas;
control to transmit the first reference signal to a base station via the first antenna at the first transmit time point,
identify a second transmit time point for transmitting a second reference signal via a second antenna among the plurality of antennas, and
control to transmit the second reference signal to the base station via the first antenna at the second transmit time point, the second reference signal being adjusted at least based on a signal received via the second antenna.

2. The electronic device of claim 1, wherein the first and second reference signals each comprise a sounding reference signal (SRS) for multi-antenna signal processing via uplink channel state measurement.

3. The electronic device of claim 1, wherein the communication processor is configured to control to transmit antenna-related information to the base station.

4. The electronic device of claim 3, wherein the communication processor is configured to:

receive, from the base station, transmit time point information related to a transmit time point for reference signals which correspond to each antenna among the plurality of antennas, and control to transmit each of a plurality of reference signals at different times via a specified antenna among a plurality of antennas based on the received transmit time point information.

5. The electronic device of claim 1, wherein the second reference signal is adjusted at least based on a difference between strength of the signal received via the second antenna and strength of a signal received via the first antenna.

6. The electronic device of claim 1, wherein the second reference signal is adjusted further based on a difference between path loss (PL) of a signal transmitted via the second antenna and path loss of a signal transmitted via the first antenna.

7. The electronic device of claim 1, wherein an amplitude of the second reference signal is adjusted at least based on the signal received via the second antenna.

8. The electronic device of claim 1, wherein a phase of the second reference signal is adjusted at least based on the signal received via the second antenna.

9. A method to transmit a reference signal in an electronic device comprising a communication processor, at least one radio frequency integrated circuit (RFIC) connected to the communication processor, at least one radio frequency front-end (RFFE) circuit connected to the at least one RFIC and configured to process a transmission signal, and a plurality of antennas connected via the at least one RFFE circuit, the method comprising:

identifying a first transmit time point for transmitting a first reference signal via a first antenna among the plurality of antennas;

transmitting the first reference signal to a base station via the first antenna at the first transmit time point;

identifying a second transmit time point for transmitting a second reference signal via a second antenna among the plurality of antennas; and transmitting the second reference signal, to the base station via the first antenna at the second transmit time point, the second reference signal being adjusted at least based on a signal received via the second antenna.

10. The method of claim 9, wherein the first and second reference signals each comprise a sounding reference signal (SRS) for multi-antenna signal processing via uplink channel state measurement.

11. The method of claim 9, further comprising:
transmitting antenna-related information to the base station.

12. The method of claim 11, further comprising:
receiving, from the base station, transmit time point information related to a transmit time point for reference signals which corresponds to each antenna among the plurality of antennas; and transmitting each of a plurality of reference signals at different time via a specified antenna among a plurality of antennas based on the received transmit time point information.

13. The method of claim 9, wherein:
the second reference signal is adjusted at least based on a difference between strength of the signal received via the second antenna and strength of a signal received via the first antenna.

14. The method of claim 9, wherein the second reference signal is adjusted further based on a difference between path loss (PL) of a signal transmitted via the second antenna and path loss of a signal transmitted via the first antenna.

15. The method of claim 9, wherein an amplitude of the second reference signal is adjusted at least based on the signal received via the second antenna.

16. The method of claim 9, wherein a phase of the second reference signal is adjusted at least based on the signal received via the second antenna.

* * * * *